United States Patent
Schultz et al.

(10) Patent No.: US 10,750,915 B2
(45) Date of Patent: Aug. 25, 2020

(54) VACUUM CLEANING SYSTEMS AND METHODS INCLUDING SLIDE OUT DRUM AND FILTER INTERLOCK DEVICE

(71) Applicant: Emerson Electric Co., St. Louis, MO (US)

(72) Inventors: Douglas C. Schultz, Glen Carbon, IL (US); Neelam Manish Karle, Pune (IN); Rahul Shrihari Doke, Pune (IN); Devdatta Namdev Shingate, Satara (IN); Vikas Mahadev Jadhav, Pune (IN)

(73) Assignee: Emerson Electric Co., St. Louis, MO (US)

( * ) Notice: Subject to any disclaimer, the term of this patent is extended or adjusted under 35 U.S.C. 154(b) by 308 days.

(21) Appl. No.: 15/864,681

(22) Filed: Jan. 8, 2018

(65) Prior Publication Data

US 2018/0192839 A1    Jul. 12, 2018

Related U.S. Application Data

(60) Provisional application No. 62/443,928, filed on Jan. 9, 2017.

(51) Int. Cl.
| | |
|---|---|
| *B60S 1/64* | (2006.01) |
| *A47L 9/12* | (2006.01) |
| *A47L 5/38* | (2006.01) |
| *A47L 9/14* | (2006.01) |
| *A47L 7/00* | (2006.01) |
| *B01D 46/00* | (2006.01) |

(52) U.S. Cl.
CPC ............... *A47L 9/1472* (2013.01); *A47L 5/38* (2013.01); *A47L 7/0076* (2013.01); *A47L 9/12* (2013.01); *A47L 9/1409* (2013.01); *A47L 9/1463* (2013.01); *B01D 46/009* (2013.01); *B01D 46/0097* (2013.01); *B01D 2279/55* (2013.01); *B60S 1/64* (2013.01)

(58) Field of Classification Search
CPC .............. B01D 46/009; B01D 46/0097; B01D 2279/55; B60S 1/64; A47L 9/1472; A47L 9/12; A47L 7/0076; A47L 9/1409; A47L 9/1463; A47L 5/38
USPC .... 55/334, 368, 413, 416, 439; 15/339, 347, 15/350, 353
See application file for complete search history.

(56) References Cited

U.S. PATENT DOCUMENTS

| | | | |
|---|---|---|---|
| 4,209,875 A | 7/1980 | Pugh | |
| 5,189,753 A | 3/1993 | Sousa | |

(Continued)

FOREIGN PATENT DOCUMENTS

| | | |
|---|---|---|
| CN | 2871268 Y | 2/2007 |
| DE | 19916199 A1 | 10/2000 |

(Continued)

*Primary Examiner* — Minh Chau T Pham
(74) *Attorney, Agent, or Firm* — Armstrong Teasdale LLP

(57) ABSTRACT

A vacuum cleaning system includes a housing, a motor connected to the housing, a debris container, a filter assembly, and a stop. The housing defines an inlet, an outlet, and a receptacle. The motor is adapted to generate air flow through the housing from the inlet to the outlet. The debris container is slidable into and out of the housing receptacle. The stop is connected to the housing and adapted to inhibit mounting the debris container when the filter assembly is absent from the debris container.

19 Claims, 19 Drawing Sheets

(56) References Cited

U.S. PATENT DOCUMENTS

| | | | |
|---|---|---|---|
| 5,495,636 A * | 3/1996 | Dekker | A47L 9/2842 |
| | | | 15/339 |
| 5,598,605 A | 2/1997 | Tomasiak | |
| 5,606,769 A | 3/1997 | Tomasiak | |
| 5,829,091 A | 11/1998 | Ingram | |
| 5,961,676 A * | 10/1999 | King | A47L 9/00 |
| | | | 15/347 |
| 6,128,804 A | 10/2000 | Lee | |
| 6,490,751 B2 | 12/2002 | Ganzenmuller | |
| 6,497,443 B2 | 12/2002 | Worrell | |
| 6,691,396 B2 | 2/2004 | Martin | |
| 6,813,805 B2 | 11/2004 | Ganzenmuller | |
| 7,052,272 B2 | 5/2006 | Sung | |
| 7,152,272 B2 | 12/2006 | Rukavina | |
| 7,231,686 B1 | 6/2007 | Matheney | |
| 7,266,859 B2 | 9/2007 | Slone | |
| 7,480,957 B2 | 1/2009 | Ganzenmuller, V | |
| 7,494,520 B2 * | 2/2009 | Nam | A47L 9/1666 |
| | | | 15/347 |
| 7,513,007 B2 | 4/2009 | Chernoff | |
| 8,286,300 B2 | 10/2012 | Norell | |
| 8,312,590 B2 | 11/2012 | Norell | |
| 8,347,452 B2 | 1/2013 | Maehata | |
| 8,418,312 B2 | 4/2013 | Rhea | |
| 8,615,845 B2 | 12/2013 | Norell | |
| 8,689,399 B2 * | 4/2014 | Liu | A47L 9/1481 |
| | | | 15/347 |
| 8,714,613 B1 | 5/2014 | Gillis | |
| 8,806,707 B2 * | 8/2014 | Soen | A47L 9/165 |
| | | | 15/353 |
| 8,973,214 B2 * | 3/2015 | Conrad | A47L 9/00 |
| | | | 15/353 |
| 9,003,600 B2 | 4/2015 | Norell | |
| 9,561,753 B1 | 2/2017 | Mendoza Vera | |
| 9,751,504 B2 | 9/2017 | Schultz | |
| 2004/0107528 A1 | 6/2004 | LeClear | |
| 2004/0154122 A1 | 8/2004 | Xu | |
| 2006/0080801 A1 | 4/2006 | Nameth | |
| 2006/0267552 A1 | 11/2006 | Baer | |
| 2009/0019662 A1 | 1/2009 | Yona | |
| 2009/0189498 A1 * | 7/2009 | Catron | B62B 3/02 |
| | | | 312/249.8 |
| 2010/0043168 A1 | 2/2010 | Johnson | |
| 2010/0083456 A1 | 4/2010 | Norell | |
| 2013/0232724 A1 | 9/2013 | Krebs | |
| 2014/0165323 A1 | 6/2014 | Norell | |
| 2015/0283979 A1 | 10/2015 | Oh | |
| 2017/0360272 A1 * | 12/2017 | Perry | A47L 13/225 |

FOREIGN PATENT DOCUMENTS

| | | |
|---|---|---|
| JP | H08104205 A | 4/1996 |
| JP | H1024808 A | 1/1998 |
| JP | 2005319855 A | 11/2005 |
| JP | 2006212121 A | 8/2006 |

\* cited by examiner

VACUUM CLEANING SYSTEMS AND METHODS INCLUDING SLIDE OUT DRUM AND FILTER INTERLOCK DEVICE

CROSS-REFERENCE TO RELATED APPLICATIONS

This application claims priority to U.S. Provisional Patent Application Ser. No. 62/443,928, filed on Jan. 9, 2017, the disclosure of which is hereby incorporated by reference in its entirety.

FIELD

The field of the disclosure relates generally to vacuum cleaning systems, and more particularly, to interlock devices for preventing insertion of a slide-out drum within a vacuum cleaning system when a filter assembly is not installed.

BACKGROUND

Vacuum cleaners typically include a suction unit, a conduit (e.g., a flexible hose or tube) connected to the suction unit, and a canister or drum in which the suctioned debris is collected and stored. In some vacuum cleaners, the drum is mounted in a housing and can slide out of the housing to ease emptying of the drum. Further, some vacuum cleaners include a filter assembly that filters small particles and other debris out of the air flow to prevent such particles from reaching the suction unit. Operation of such vacuum cleaners without a filter assembly in place may result in blockage of the flow path, excessive wear on components of the suction unit, and debris and other particles being undesirably exhausted from the vacuum cleaner.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum cleaning system includes a housing, a motor connected to the housing, a debris container, a filter assembly removably connectable to the debris container, and a stop connected to the housing. The housing defines an inlet, an outlet, and a receptacle. The motor is adapted to generate air flow through the housing from the inlet to the outlet. The debris container is slidable into and out of the housing receptacle, and includes a stop surface. The filter assembly is adapted to filter the air flow, and includes an engagement surface. The stop includes a pin moveable between an extended position, in which the pin extends into the housing receptacle, and a retracted position, and a spring that biases the pin towards the extended position. The pin is adapted to engage the stop surface to inhibit insertion of the debris container when the debris container is inserted into the housing receptacle without the filter assembly, and, upon insertion of the debris container with the filter assembly, the engagement surface at least one of displaces the pin from the extended position to the retracted position and maintains the pin in the retracted position such that the debris container can be fully inserted into the housing receptacle.

In another aspect, a vacuum cleaning system mounted in a vehicle includes a housing mounted in the vehicle, a motor connected to the housing, a debris container, a filter assembly connected to the debris container, and a stop connected to the housing and including a retractable pin. The housing defines an inlet, an outlet, and a receptacle. The motor is adapted to generate air flow through the housing from the inlet to the outlet. The debris container is slidable into and out of the housing receptacle. The filter assembly is adapted to filter the air flow. Upon insertion of the debris container into the housing receptacle, the filter assembly is adapted to at least one of: displace the pin from an extended position to a retracted position and maintain the pin in the retracted position such that the debris container can be fully inserted into the housing receptacle.

In yet another aspect, a vacuum cleaning system includes a housing, a motor connected to the housing, a debris container, a filter assembly, and a stop. The housing defines an inlet, an outlet, and a receptacle. The motor is adapted to generate air flow through the housing from the inlet to the outlet. The debris container is slidable into and out of the housing receptacle. The stop is connected to the housing and adapted to inhibit mounting the debris container when the filter assembly is absent from the debris container.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
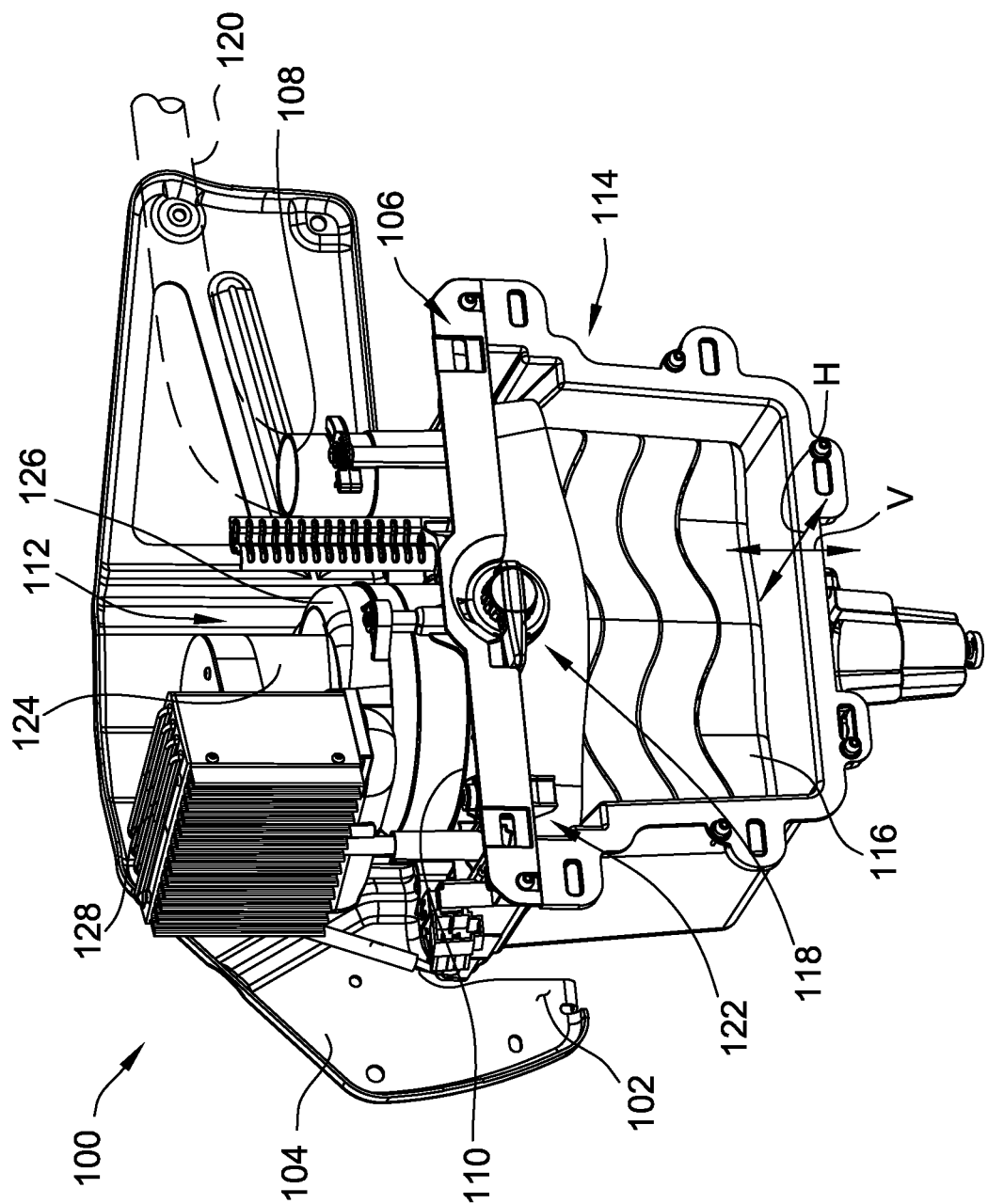
FIG. 1 is a perspective view of an example vacuum cleaning system as embodied in a vehicular vacuum cleaner.

FIG. 1 is a perspective view of an example vacuum cleaning system 100, as embodied in a vehicular vacuum cleaner. Specifically, the vacuum cleaning system 100 of the illustrated embodiment is designed for mounting in and use in a vehicle such as an automobile, recreational vehicle, watercraft, or aircraft. In this example, the vacuum cleaning system 100 connects to a power supply of the vehicle, and, as shown in FIG. 1, is positioned within a cavity 102 of the vehicle defined between two vehicle panels 104, one of which is shown in FIG. 1. The cavity 102 is generally isolated or separated from a passenger compartment of the vehicle by at least one of the vehicle panels 104. Although the vacuum cleaning system 100 is shown and described with reference to a vehicular vacuum cleaner, the vacuum cleaning system 100 and features thereof may be embodied in vacuum cleaners other than vehicular vacuum cleaners including, for example and without limitation, wet/dry vacuum cleaners, canister vacuum cleaners, upright vacuum cleaners, and backpack vacuum cleaners.

In the example embodiment, the vacuum cleaning system 100 generally includes a housing 106 defining an inlet 108 and an outlet 110, a suction unit 112 connected to the housing 106 and adapted to generate air flow through the housing 106 from the inlet 108 to the outlet 110, and a drum assembly 114 that includes a drum or debris container 116 that slides into (slidable into) and out of the housing 106 in a horizontal direction H (generally, a first direction). The debris container 116 includes a dual-action latching mechanism or knob 118 that facilitates securing the debris container 116 to the housing 106. In particular, the dual-action latching mechanism 118 facilitates moving the debris container in both the horizontal direction H and a vertical direction V (generally, a second direction) oriented perpendicular to the horizontal direction H to secure the debris container 116 to the housing 106. The vacuum cleaning system 100 also includes a vacuum conduit 120 (shown in broken lines in FIG. 1) that connects to the inlet 108 and enables a user to selectively direct suction generated by the vacuum cleaning system 100 to a desired location.

The vacuum cleaning system 100 also includes an interlock device or stop mechanism 122 (generally, a stop). As described in more detail herein, the stop mechanism 122 prevents insertion of the debris container 116 into the housing 106 when a filter assembly is not installed in the debris container 116.

The suction unit 112 generally includes a motor 124 and a fan or impeller assembly 126 operatively connected to the motor 124 to drive the fan and generate suction or negative pressure to permit debris and other material to be collected via the vacuum conduit 120. In the illustrated embodiment, the suction unit 112 is connected to the outlet 110 of the housing 106, and establishes a negative pressure or vacuum within the debris container 116 when activated. Negative pressure established by the suction unit 112 is transferred to the vacuum conduit 120, and creates suction along the vacuum conduit 120, thereby allowing dust and debris to be entrained within suction flow, and deposited in the debris container 116. In some embodiments, the vacuum cleaning system 100 may also include one or more filter or media assemblies interfaced between the vacuum inlet 108 and the impeller assembly 126 to collect finer particles or media entrained within the suction flow generated by the vacuum cleaning system 100. Air flow is exhausted from the vacuum cleaning system 100 through an exhaust manifold 128 connected downstream from the motor 124 and the impeller assembly 126. In this embodiment, the air flow is exhausted from the exhaust manifold 128 into the vehicle cavity 102, which is enclosed by two of the vehicle panels 104.

Figure 2:
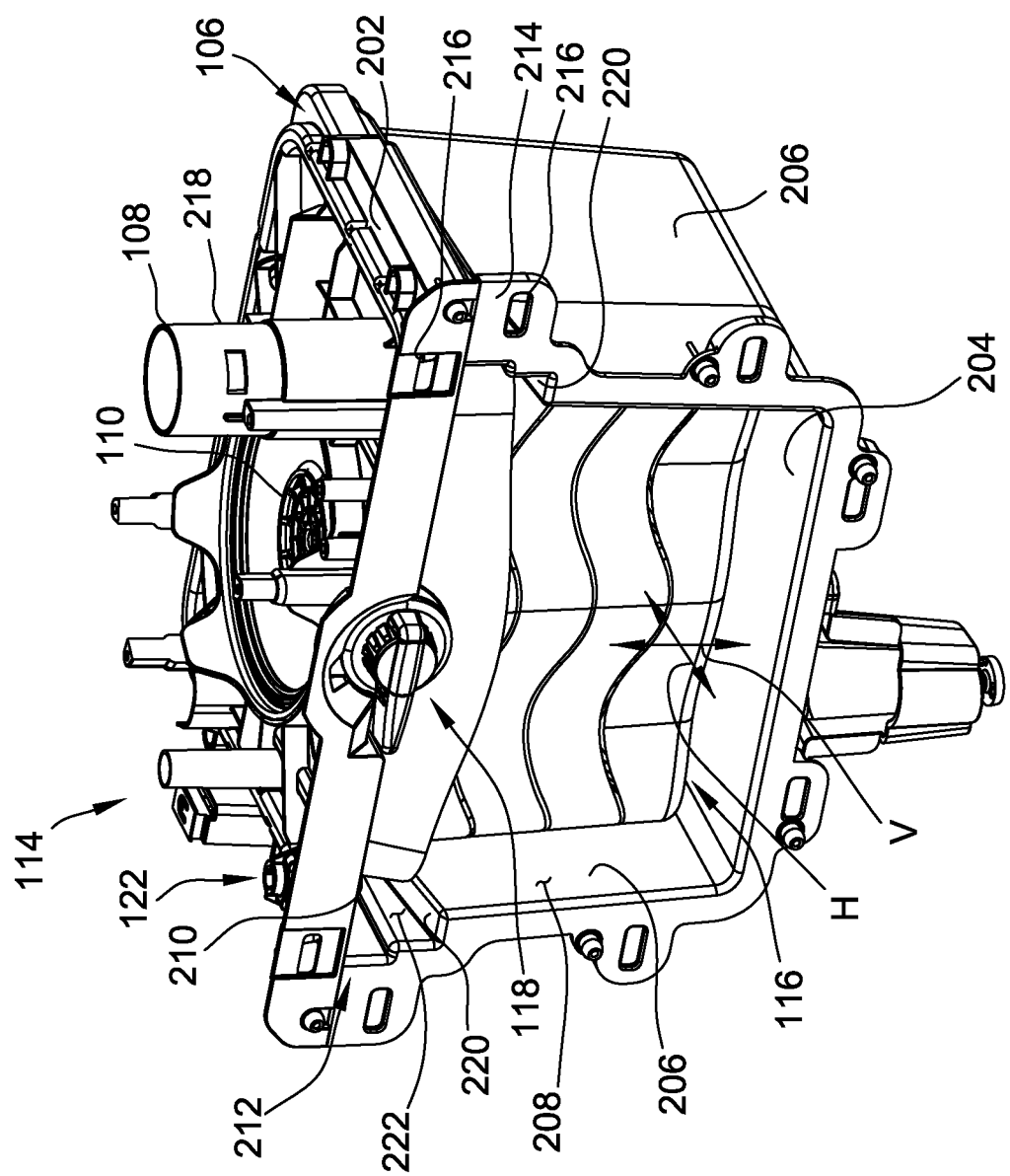
FIG. 2 is a perspective view of a drum assembly of the vacuum cleaning system shown in FIG. 1.

With additional reference to FIG. 2, the housing 106 of the example embodiment includes a top panel 202, a bottom panel 204, and a pair of opposing side panels 206 extending between the top panel 202 and the bottom panel 204. Together, the top panel 202, bottom panel 204, and side panels 206 at least partially define a receptacle 208 in which the debris container 116 is received. An opening 210 is defined at a front 212 of the housing 106 to allow the debris container 116 to be inserted into and removed from the receptacle 208.

The housing 106 of the example embodiment also includes a mounting panel or flange 214 that adjoins each of the top panel 202, the bottom panel 204, and the side panels 206 at the front 212 of the housing 106. The mounting flange 214 extends generally outward at an angle of about 90° from each of the top panel 202, the bottom panel, and the side panels 206 to define a substantially flush or planar surface for connection to a panel of the vehicle in which the vacuum cleaning system 100 is installed. The mounting flange 214 includes a plurality of fastener openings 216 sized and shaped to receive corresponding fasteners therein to secure the housing 106 to a vehicle panel.

In the example embodiment, the inlet 108 and the outlet 110 are both defined along the top panel 202 of the housing 106. Further, in the example embodiment, the inlet 108 is defined by a cylindrical tube 218 that extends outward from the top panel 202 and defines a connection interface for connection to the vacuum conduit 120. In other embodiments, the inlet 108 and the outlet 110 may be defined at any location on the housing 106 that enables the vacuum cleaning system 100 to function as described herein.

Still referring to FIG. 2, in the example embodiment, each of the side panels 206 includes a ledge 220 that least partially defines a slot 222 extending rearward (i.e., away from the front 212 of the housing 106) into the housing 106 in the horizontal direction H. Each slot 222 is sized and shaped to receive a corresponding component of the debris container 116 to facilitate sliding the debris container 116 into and out of the housing 106 in the horizontal direction H.

Figure 3:
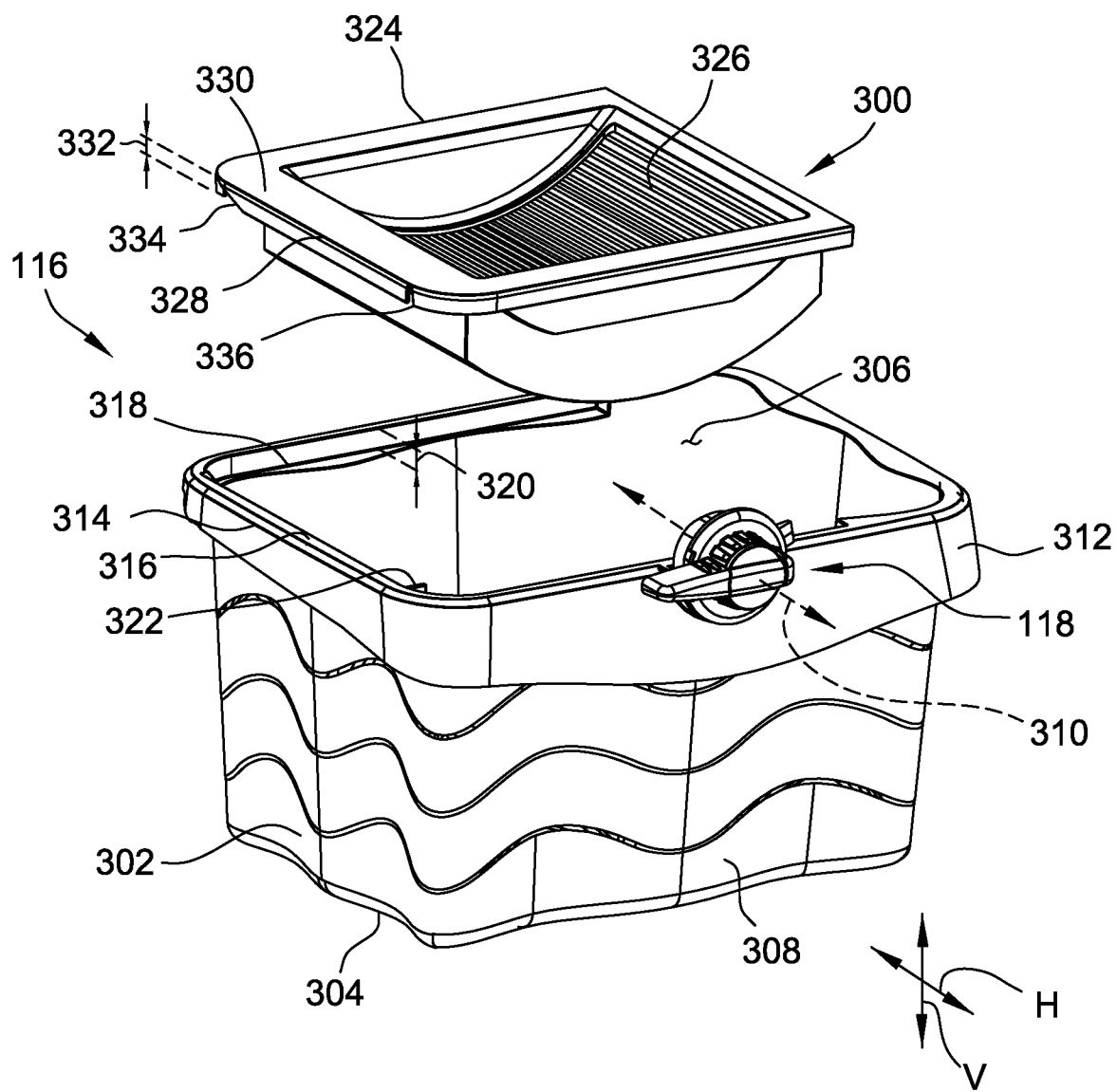
FIG. 3 is a partially exploded perspective view of a debris container of the drum assembly shown in FIG. 2, and a filter assembly.
Figure 4:
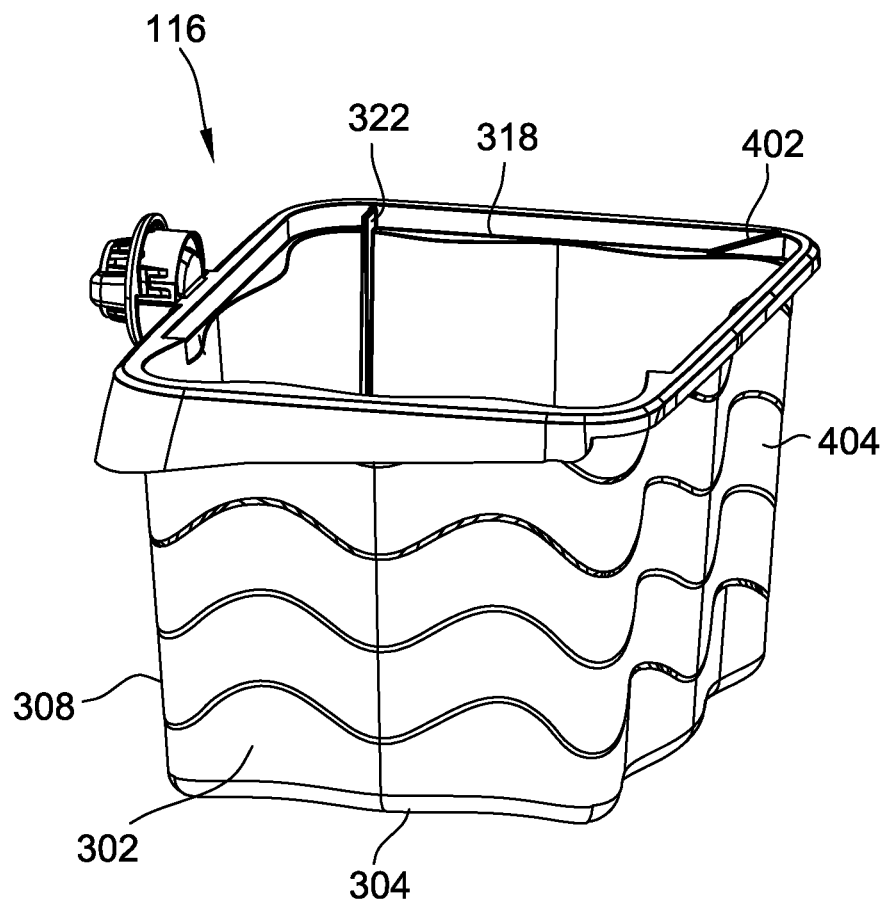
FIG. 4 is a rear perspective view of the debris container shown in FIG. 3.

FIG. 3 is a partially exploded perspective view of the debris container 116 shown in FIG. 2 and a filter assembly 300. FIG. 4 is a rear perspective view of the debris container 116, with the filter assembly 300 omitted. As shown in FIG. 3, the debris container 116 generally includes a sidewall 302 and a bottom wall 304 that together define a storage cavity 306 in which debris and other particles collected by the vacuum cleaning system 100 are stored. The debris container 116 is removable from the housing 106 by sliding the debris container 116 out of the receptacle 208 forward in the horizontal direction H.

The knob 118 is connected to a front 308 of the debris container 116 for rotation about a rotation axis 310. In the example embodiment, the rotation axis 310 is parallel to the horizontal direction H. In other embodiments, the rotation axis 310 may be oriented other than parallel (i.e., at an oblique angle to) the horizontal direction H.

The knob 118 is rotatable about the rotation axis 310 in a first rotational direction and a second rotational direction opposite the first rotational direction. Moreover, the knob 118 is rotatable between a first, unlatched position and a second, latched position (shown in FIG. 4). The knob 118 includes a plurality of camming features (e.g., two camming features, not shown in FIG. 4) that cooperatively engage corresponding camming features of housing 106 upon rotation of the knob 118 in the second rotational direction (i.e., from the first position to the second position) such that the debris container 116 moves in both the horizontal direction H and the vertical direction V to facilitate securing the debris container 116 to the housing 106 and sealing off the storage cavity 306.

The debris container 116 also includes a lip or rim 312 extending around an upper edge 314 of the debris container 116. The rim 312 is sized and shaped to be received in each of the slots 222 defined by the side panels 206 to facilitate sliding the debris container 116 into and out of the housing 106. Further, in the example embodiment, the rim 312 has an inverted U-shape along the front 308 of the debris container 116 to define a handle to facilitate grasping of the rim 312 for removal and replacement of the debris container 116.

In the example embodiment, the rim 312 extends continuously and entirely around the upper edge 314 of the debris container. In other embodiments, the rim 312 may extend around less than the full perimeter of the upper edge 314 of the debris container 116, and/or may extend discontinuously around the upper edge 314 of the debris container 116.

In some embodiments, the debris container 116 may include a seal (not shown in FIG. 3) disposed along an upper surface 316 of the debris container 116 such that, when the debris container 116 is inserted into and latched to the housing 106, the seal forms a seal around the storage cavity 306 to provide a substantially leak-free flow path from the inlet 108 to the outlet 110. In other embodiments, a seal may be disposed on a lower surface of the housing 106 adjacent the upper surface 316 of the debris container 116.

The debris container 116 also includes a recessed ledge 318 extending inward from the debris container sidewall 302, and positioned at a vertical distance or depth 320 beneath the upper edge 314. The recessed ledge 318 supports the filter assembly 300 within the debris container 116. The debris container 116 also includes a stop wall or rib 322 located proximate the front 308 of the debris container 116 and defining a stop surface. The stop rib 322 cooperates with the stop mechanism 122 to inhibit the debris container 116 from being fully inserted and mounted within the housing receptacle 208 when the filter assembly 300 is not installed in the debris container 116. In this embodiment, the stop rib 322 extends inward from the debris container sidewall 302, and upward from the recessed ledge 318. In other embodiments, the stop rib 322 may extend from only one of the sidewall 302 and the ledge 318.

As shown in FIG. 4, the debris container 116 also includes a sloped surface or ramp 402 extending upward from the recessed ledge 318 near a rear 404 of the debris container 116. The ramp 402 cooperates with the stop mechanism 122 to facilitate removal of the debris container 116 from the housing receptacle 208 if the debris container 116 is partially inserted in the housing receptacle 208 without the filter assembly 300.

Referring again to FIG. 3, the filter assembly 300 generally includes a support 324 and a filter media 326 connected to the support 324 for removing debris and particles from the air flow between the inlet 108 and the outlet 110.

The support 324 includes an upper flange 328 that sits or rests upon the recessed ledge 318 when the filter assembly 300 is installed in the debris container 116. The support 324 also includes an upper engagement surface 330 that cooperates with the stop mechanism 122 to facilitate inserting the debris container 116 into the housing receptacle 208, as described in more detail herein.

The upper flange 328 has a thickness 332 that corresponds to the vertical depth 320 of the recessed ledge 318 such that the engagement surface 330 of the filter assembly 300 is substantially flush or conformal with the upper surface 316 of the debris container 116 when the filter assembly 300 is installed in the debris container 116.

In this embodiment, the upper flange 328 includes cutouts 334 and 336 sized and shaped to receive portions of the debris container 116 therein. Specifically, in this embodiment, the cutout 334 is sized and shaped to receive the ramp 402 of the debris container 116, and the cutout 336 is sized and shaped to receive the stop rib 322 of the debris container 116.

Figure 5:
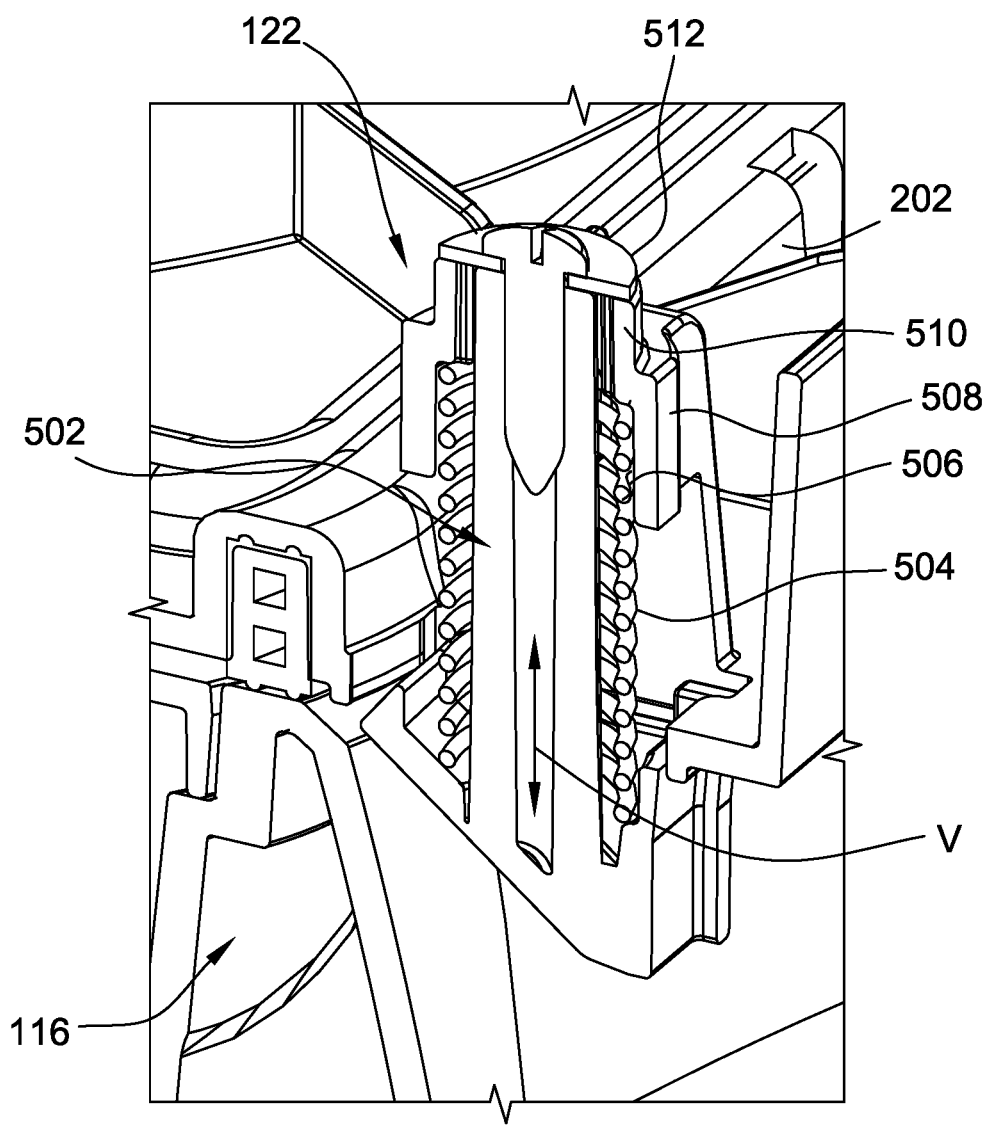
FIG. 5 is an enlarged cutaway view of a portion of a housing of the vacuum cleaning system shown in FIG. 1.

FIG. 5 is an enlarged cutaway view of a portion of the housing 106 shown in FIG. 1. As shown in FIG. 5, the stop mechanism 122 generally includes a spring-loaded, retractable pin 502 and a spring 504 that biases the pin 502 towards an extended position.

Figure 8:
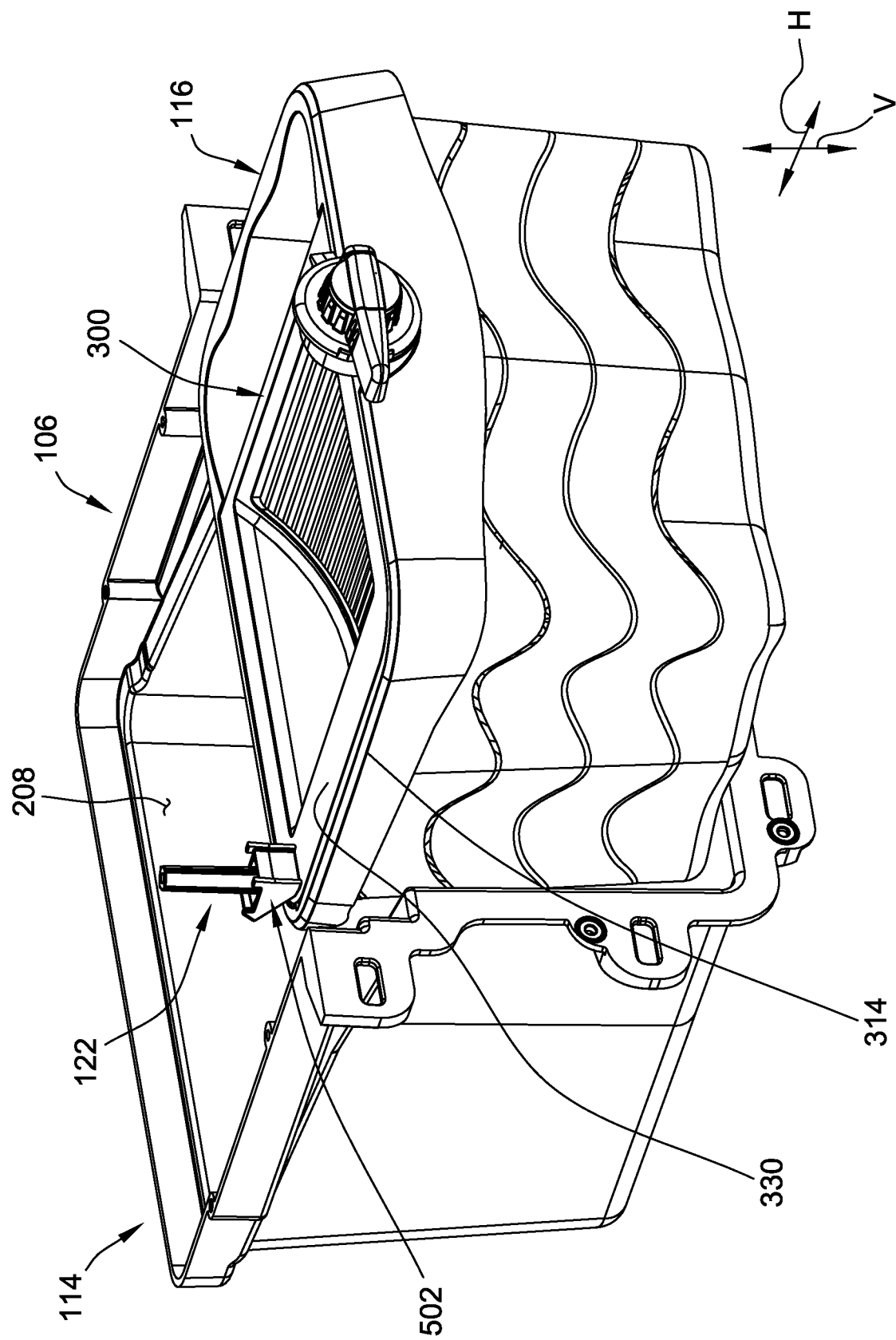
Figure 9:
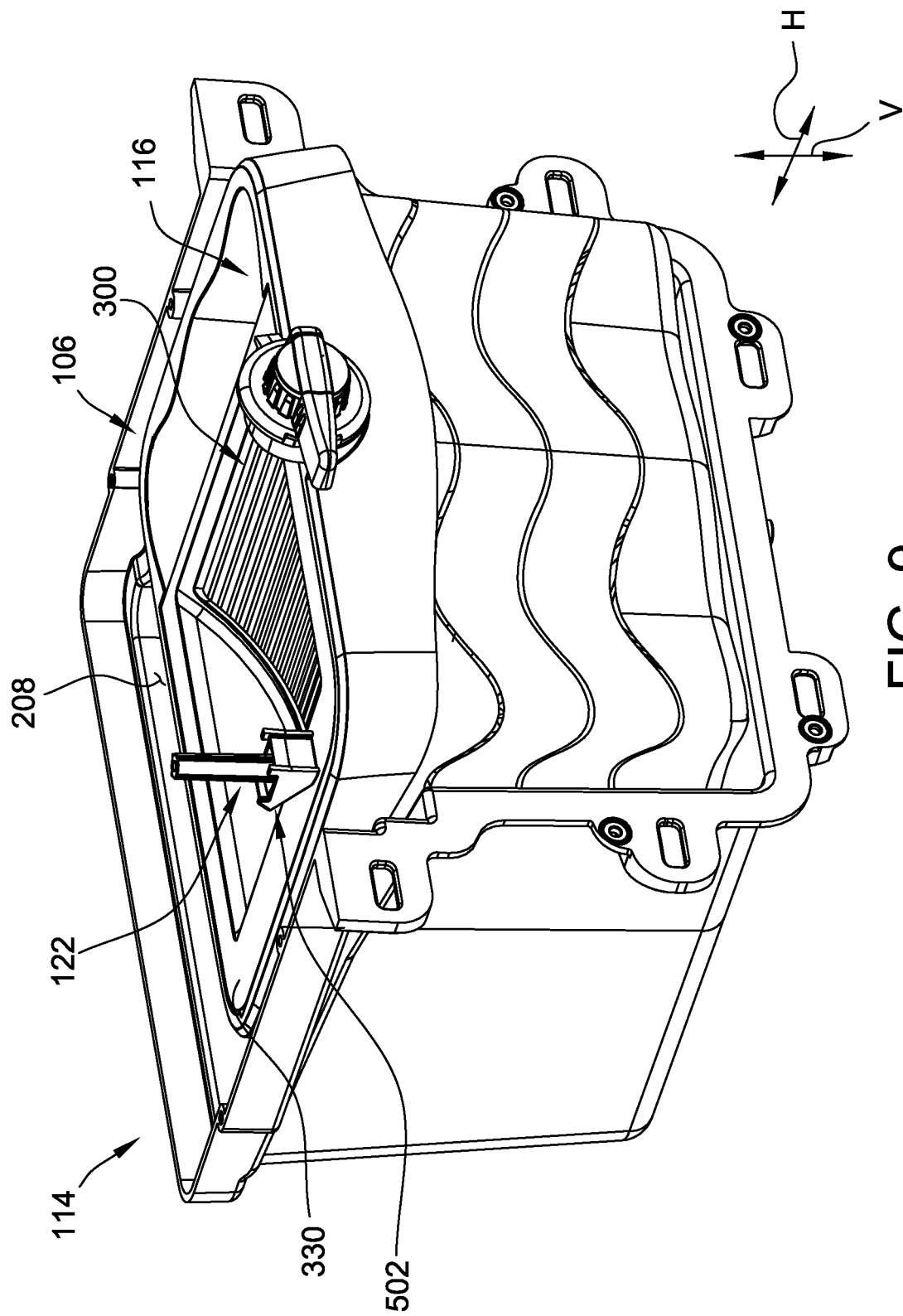
Figure 10:
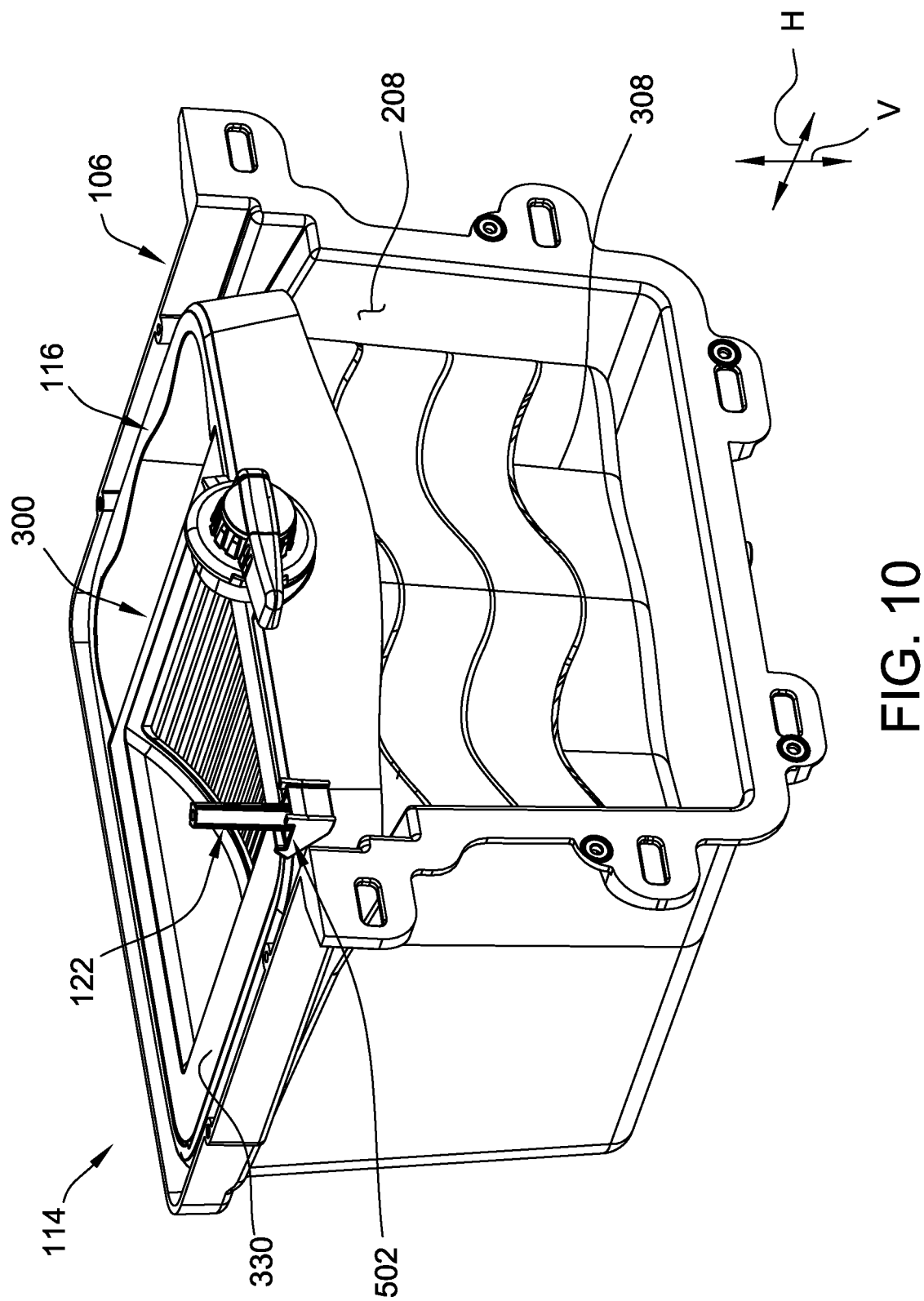

The pin 502 is moveable between a first, retracted position, shown in FIGS. 8 and 9, and a second, extended position shown in FIG. 5. When the pin 502 is in the extended position, at least a portion of the pin 502 extends into the housing receptacle 208. In this embodiment, the pin 502 moves in the vertical direction V between the retracted position and the extended position. In other embodiments, the pin 502 may move along any suitable direction between the retracted and extended positions that enables the stop mechanism 122 to function as described herein, such as the horizontal direction H, or a direction oriented at an oblique angle relative to the vertical direction V and/or the horizontal direction H.

The pin 502 and spring 504 are housed within a pin cavity 506 defined by an extension or pin support 508 extending upward from the top panel 202. The pin support 508 includes a shaft guide 510 that engages the pin 502 to maintain alignment of the pin 502, and a stop wall 512 that engages the pin 502 to limit movement of the pin 502 out of the pin cavity 506.

Figure 6:
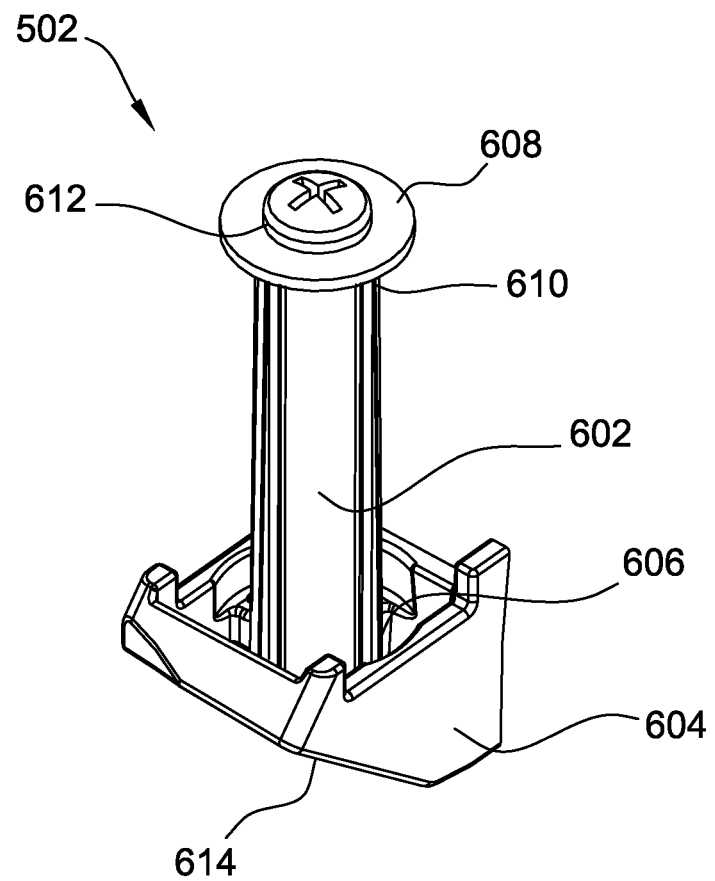
FIG. 6 is a perspective view of a pin of a stop mechanism included in the vacuum cleaning system shown in FIG. 1.

FIG. 6 is a perspective view of the pin 502 shown in FIG. 5. In this embodiment, the pin 502 includes a shaft 602, a head 604 located at a first end 606 of the shaft 602, and an annular rim 608 located at a second end 610 of the shaft 602 opposite the first end 606. In this embodiment, the annular rim 608 includes a washer that is secured to the shaft 602 by a fastener 612 (e.g., a screw). In other embodiments, the annular rim 608 may be formed integrally with the shaft 602.

With additional reference to FIG. 5, the shaft 602 engages the shaft guide 510 to maintain alignment of the pin 502 within the pin cavity 506, and the annular rim 608 engages the stop wall 512 to limit movement of the pin 502 out of the pin cavity 506, and prevent the pin 502 from falling out of the pin cavity 506.

Further, in this embodiment, the pin head 604 defines an angled engagement surface 614 that engages the front 308 of the debris container 116 (specifically, the rim 312) when the debris container 116 is removed from the housing receptacle 208. Engagement between the front 308 of the debris container 116 and the angled engagement surface 614 causes the pin 502 to move from the extended position upward to the retracted position.

FIGS. 7-10 are sequential perspective views of the drum assembly 114 as the debris container 116 is inserted into the housing receptacle 208 while the filter assembly 300 is installed in the debris container 116. The top panel 202 of the housing 106 is omitted from FIGS. 7-10 to illustrate movement of the pin 502 as the debris container 116 is inserted into the housing receptacle 208.

Figure 7:
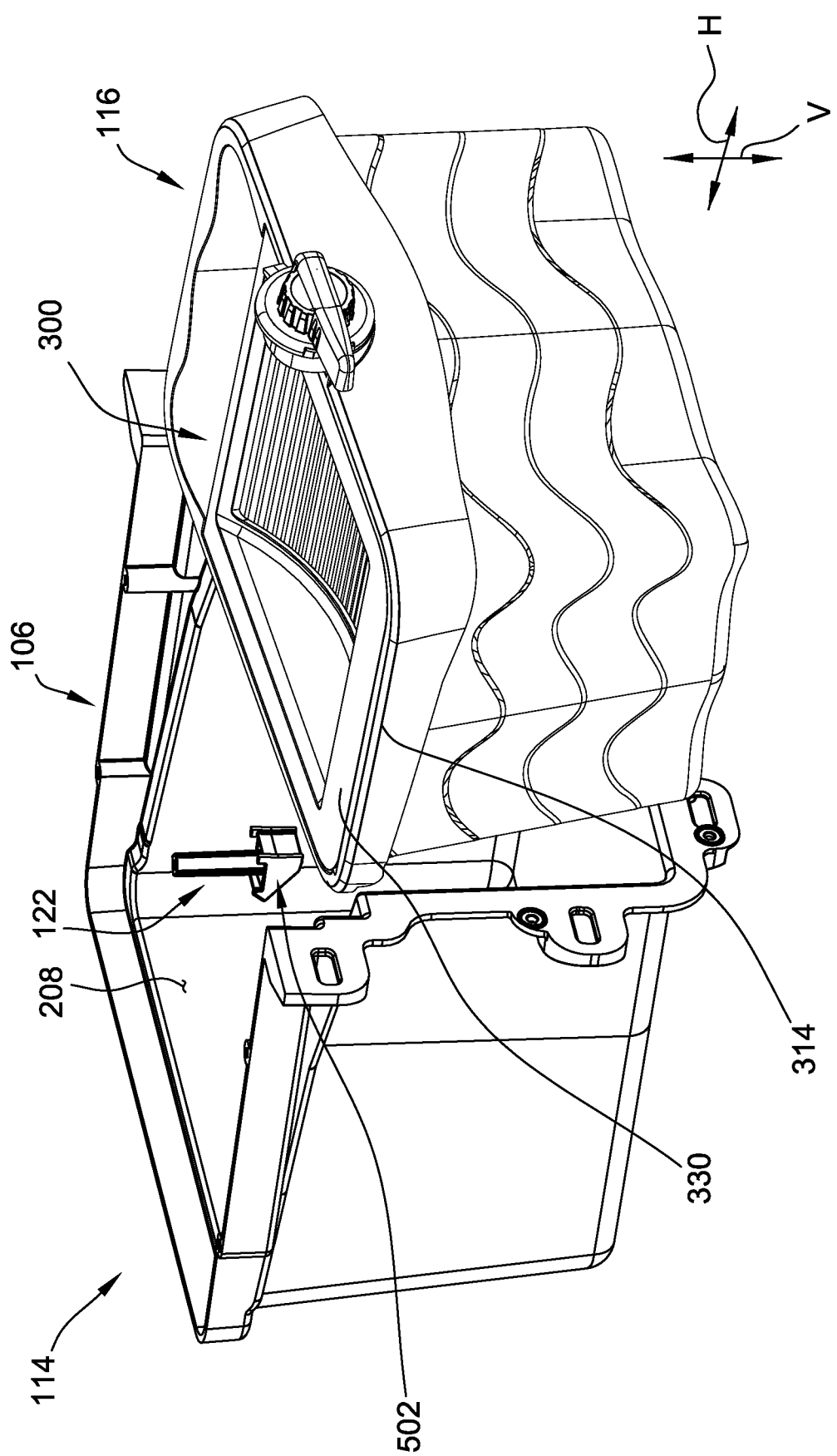
FIGS. 7-10 are sequential perspective views of the drum assembly shown in FIG. 2 as the debris container is inserted into a housing receptacle while the filter assembly is installed in the debris container.

As shown in FIG. 7, the debris container 116 is initially tilted or oriented at an oblique angle relative to the housing 106 to enable the upper edge 314 of the debris container 116 to pass beneath the pin 502. As the debris container 116 is inserted into the housing receptacle 208, the upper edge 314 of the debris container 116 and the engagement surface 330 of the filter assembly 300 engage the pin head 604 (FIG. 6), and displace the pin 502 from the extended position to the retracted position, shown in FIG. 8. As shown in FIG. 9, as the debris container 116 is further inserted into the housing receptacle 208, the engagement surface 330 of the filter assembly 300 maintains continuous engagement with the pin 502, and maintains the pin 502 in the retracted position. In other words, the pin 502 rides or slides along the engagement surface 330 of the filter assembly 300. As the debris container 116 is fully inserted into the housing receptacle 208, shown in FIG. 10, the front 308 of the debris container 116 traverses the pin 502, allowing the pin 502 to move from the retracted position to the extended position under the force of the spring 504. When the debris container 116 is removed from the housing receptacle 208, the angled engagement surface 614 of the pin head 604 (FIG. 6) engages the front 308 of the debris container 116 (specifically, the rim 312), causing the pin 502 to move from the extended position to the retracted position and permitting the debris container 116 to be removed from the housing receptacle 208.

Figure 11:
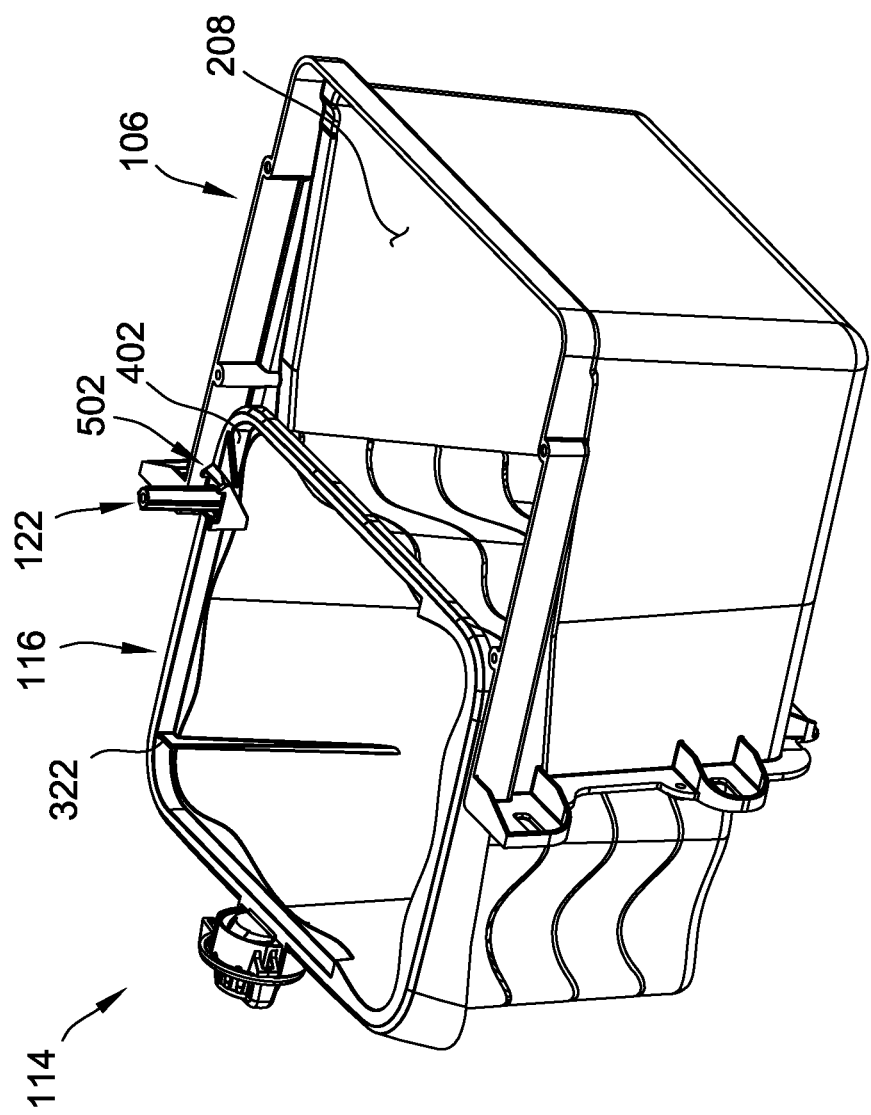
FIGS. 11 and 12 are sequential rear perspective views of the drum assembly shown in FIG. 2 as the debris container is inserted into the housing receptacle while the filter assembly is absent from the debris container.
Figure 12:
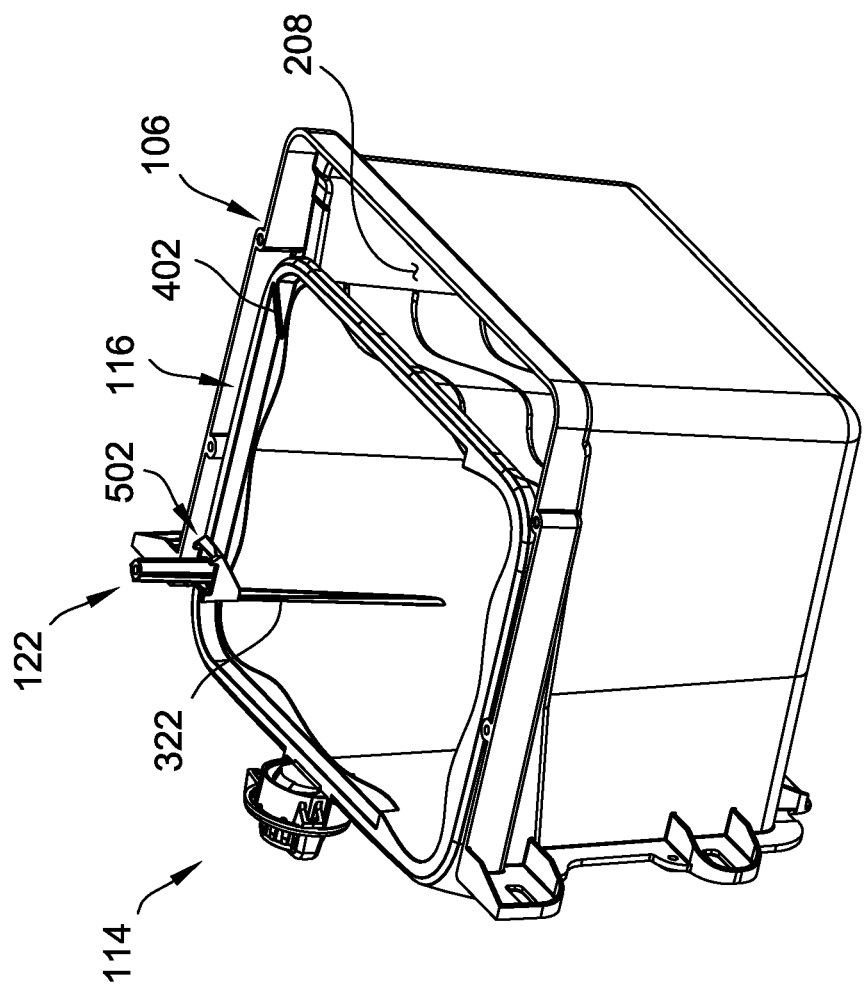

FIGS. 11 and 12 are sequential rear perspective views of the drum assembly 114 as the debris container 116 is inserted into the housing receptacle 208 while the filter assembly 300 is absent from the debris container. The top panel 202 of the housing 106 is omitted from FIGS. 11 and 12 to illustrate movement of the pin 502 as the debris container 116 is inserted into the housing receptacle 208.

As shown in FIG. 11, when the debris container 116 is inserted into the housing receptacle 208 without the filter assembly 300, the pin 502 remains in the extended position, and extends partially into the debris container 116. As shown in FIG. 12, as the debris container 116 is further inserted into the housing receptacle 208, the stop rib 322 engages the pin 502, and inhibits further insertion of the debris container 116 into the housing receptacle 208. Consequently, when the filter assembly 300 is not installed in the debris container 116, the stop mechanism 122 prevents the debris container 116 from being fully inserted into the housing receptacle 208, and prevents the debris container 116 from sealing the flow path between the housing inlet 108 and the housing outlet 110 (shown in FIG. 1), thereby preventing suction along the vacuum conduit 120 (shown in FIG. 1). When the debris container 116 is removed from the housing receptacle 208, the angled engagement surface 614 (FIG. 6) engages the ramp 402 of the debris container 116, moving the pin 502 upward to the retracted position and permitting the debris container 116 to be removed from the housing receptacle 208.

Figure 13:
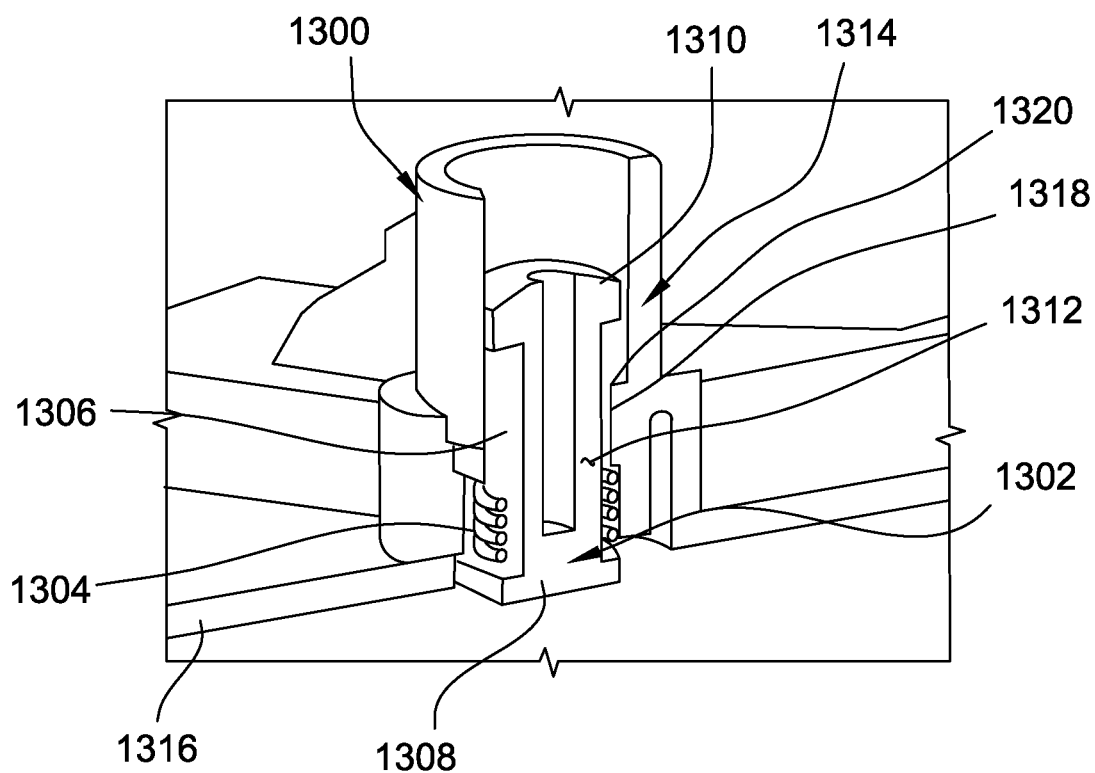
FIG. 13 is an enlarged cutaway view of another embodiment of a stop mechanism suitable for use with the vacuum cleaning system shown in FIG. 1.
Figure 14:
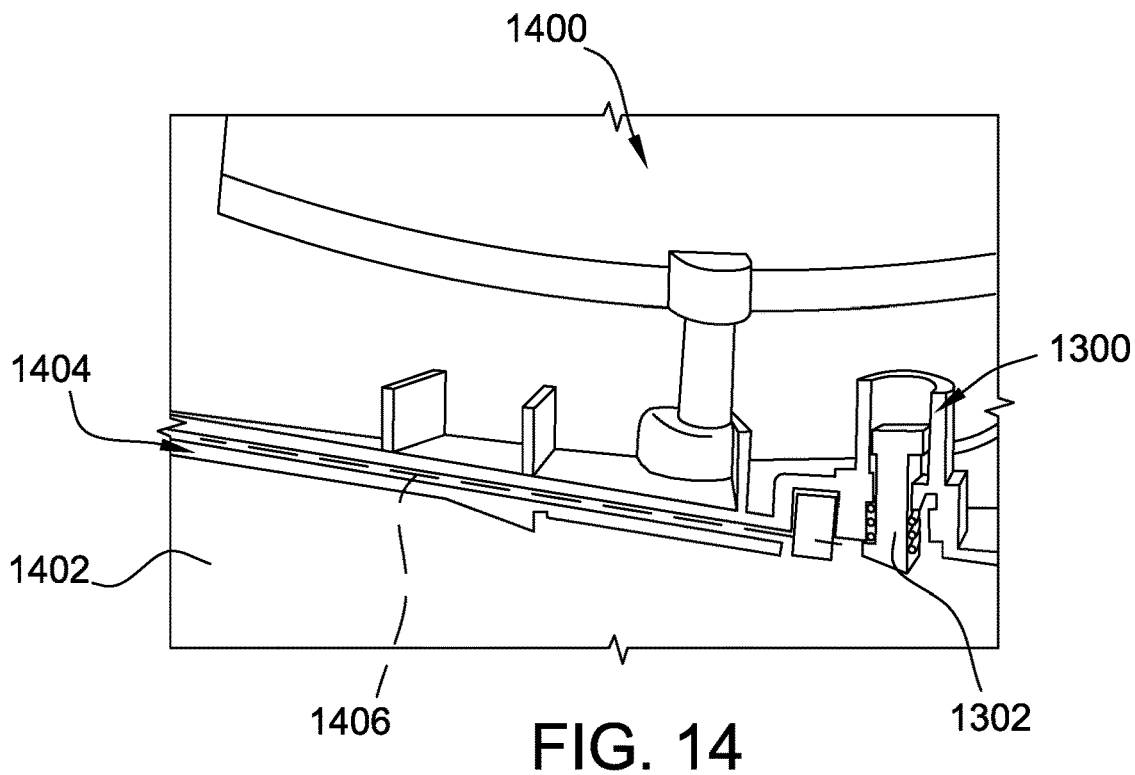
FIG. 14 is an enlarged cutaway view of a drum assembly including the stop mechanism shown in FIG. 13 and a debris container and a filter assembly positioned within the debris container.
Figure 15:
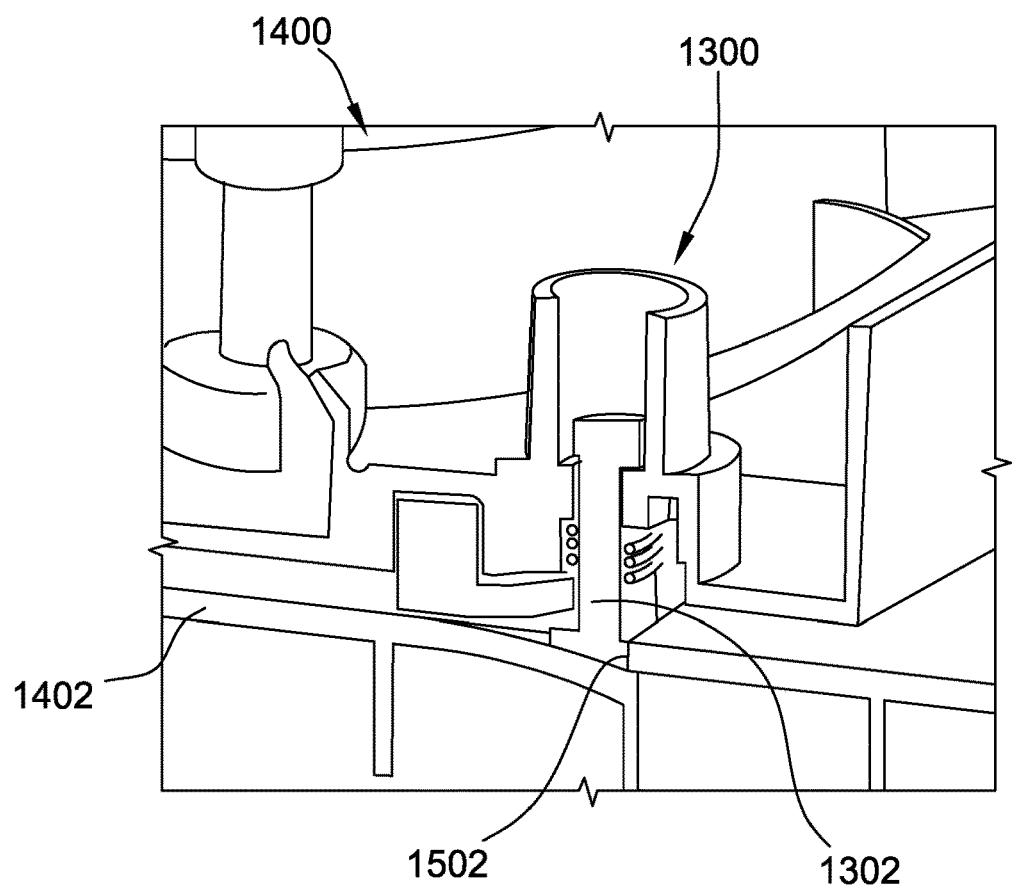
FIG. 15 is an enlarged cutaway view of the drum assembly of FIG. 14, showing the debris container inserted into the housing receptacle without the filter assembly.

FIG. 13 is an enlarged cutaway view of another embodiment of a stop mechanism 1300 suitable for use with the vacuum cleaning system of FIG. 1. FIG. 14 is an enlarged cutaway view of a drum assembly 1400, showing a debris container 1402 inserted into a housing receptacle (e.g., housing receptacle 208) with a filter assembly 1404 positioned within the debris container 1402. FIG. 15 is an enlarged cutaway view of the drum assembly 1400, showing the debris container 1402 inserted into the housing receptacle without the filter assembly 1404 (i.e., the filter assembly 1404 is absent).

As shown in FIG. 13, the stop mechanism 1300 of this embodiment includes a spring-loaded, retractable pin 1302 and a spring 1304 that biases the pin 1302 towards an extended position. The pin 1302 is moveable between a first, retracted position, shown in FIG. 13, and a second, extended position shown in FIG. 15. When the pin 1302 is in the extended position, at least a portion of the pin 1302 extends into the housing receptacle. In this embodiment, the pin 1302 moves in the vertical direction V between the retracted position and the extended position. In other embodiments, the pin 1302 may move along any suitable direction between the retracted and extended positions that enables the stop mechanism 1300 to function as described herein, such as the horizontal direction H, or a direction oriented at an oblique angle relative to the vertical direction V and/or the horizontal direction H.

In this embodiment, the pin 1302 includes a shaft 1306, a head 1308 located at a first end of the shaft 1306, and an annular rim 1310 located at a second end of the shaft 1306 opposite the first end. The pin 1302 and spring 1304 are housed within a pin cavity 1312 defined by a cylindrical extension or pin support 1314 extending upward from a housing top panel 1316. The pin support 1314 includes a shaft guide 1318 that engages the pin shaft 1306 to maintain alignment of the pin 1302 within the pin cavity 1312, and a stop wall 1320 that engages the annular rim 1310 to limit movement of the pin 1302 out of the pin cavity 1312, and prevent the pin 1302 from falling out of the pin cavity 1312.

As shown in FIG. 14, when the debris container 1402 is inserted into the housing receptacle with the filter assembly 1404 installed, the pin 1302 (specifically, the head 1308) engages an upper, engagement surface 1406 of the filter assembly 1404, and rides or slides along the upper surface 1406 such that the pin 1302 does not obstruct or impede insertion of the debris container 1402 into the housing receptacle. When the filter assembly 1404 is not installed in the debris container 1402, as shown in FIG. 15, the pin 1302 moves to the extended position and engages a rib or stop wall 1502 on the debris container 1402, thereby inhibiting further insertion of the debris container 1402 into the housing receptacle. Consequently, when the filter assembly 1404 is not installed in the debris container 1402, the stop mechanism 1300 prevents the debris container 1402 from being fully inserted into the housing receptacle, and prevents the debris container 1402 from sealing a suction flow path.

Figure 16:
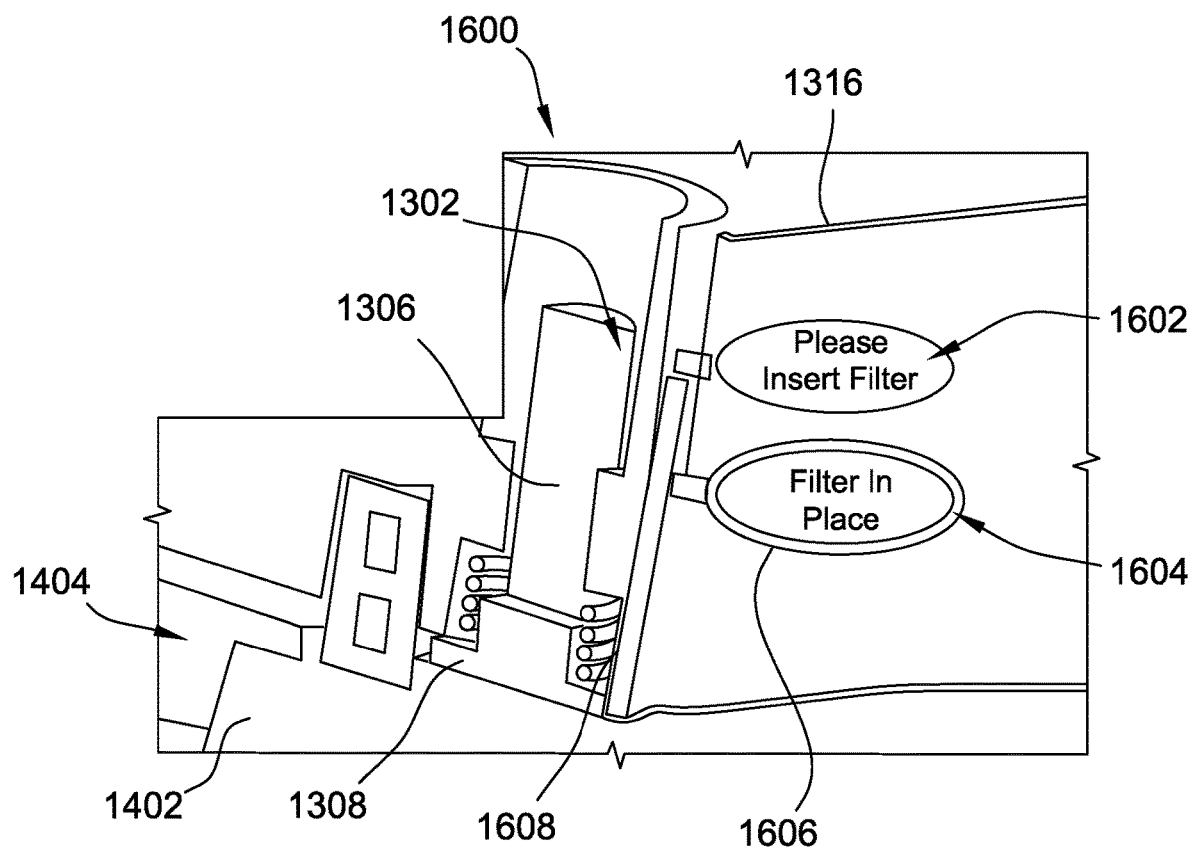
FIG. 16 is a partial cutaway view of another embodiment of a stop mechanism suitable for use with the vacuum cleaning system shown in FIG. 1.

FIG. 16 is a partial cutaway view of another embodiment of a stop mechanism 1600 suitable for use with the vacuum cleaning system 100 of FIG. 1. The stop mechanism 1600 is substantially identical to the stop mechanism 1300 illustrated and described above with references to FIGS. 13-15, except the stop mechanism 1600 includes visual indicators 1602 and 1604 to indicate the absence and presence, respectively, of the filter assembly 1404 in the debris container 1402 (FIG. 14). In the embodiment shown in FIG. 16, the housing top panel 1316 includes an opening or window 1606 through which one of the visual indicators 1602, 1604 is visible depending on the position of the retractable pin 1302. The stop mechanism 1600 of this embodiment includes a stem 1608 connected to the pin 1302. In this embodiment, the stem 1608 is connected to the pin head 1308, although the stem 1608 may be connected to other portions of the pin 1302, such as the shaft 1306. The stem 1608 extends generally upward from the pin head 1308. The visual indicators 1602 and 1604 are connected to the stem 1608 at different heights or lengths along the stem 1608 such that only one of the visual indicators 1602 or 1604 is viewable or visible through the window 1606 at a time. In this embodiment, the first visual indicator 1602 is connected at a distal end of the stem 1608, and includes a message indicating that a filter assembly is not installed in the debris container 1402. The first visual indicator 1602 is visible through the window 1606 when the pin 1302 is positioned in the extended position. The second visual indicator 1604 includes a message indicating that a filter assembly is installed in the debris container 1402. The second visual indicator 1604 is located at a height along the stem 1608 such that the second visual indicator 1604 is visible through the window 1606 when the pin 1302 is in the retracted position. Thus, when a filter assembly is installed in the debris container 1402, the pin 1302 will be moved and maintained in the retracted position as the debris container 1402 is inserted into the housing receptacle, and the second visual indicator 1604 will be displayed (i.e., visible) through the window 1606. When a filter assembly is not installed in the debris container 1402, the pin 1302 will move to the extended position as the debris container 1402 is inserted into the housing receptacle, and the first visual indicator 1602 will be displayed (i.e., visible) through the window.

Other embodiments of the stop mechanisms described herein, such as the stop mechanism 122, may include aspects of the stop mechanism 1600, such as the visual indicators 1602 and 1604. For example, the housing top panel 202 of the vacuum cleaning system 100 shown in FIG. 1 includes an opening or window similar to the window 1606, and the stop mechanism 122 includes visual indicators similar to visual indicators 1602 and 1604.

Figure 17:
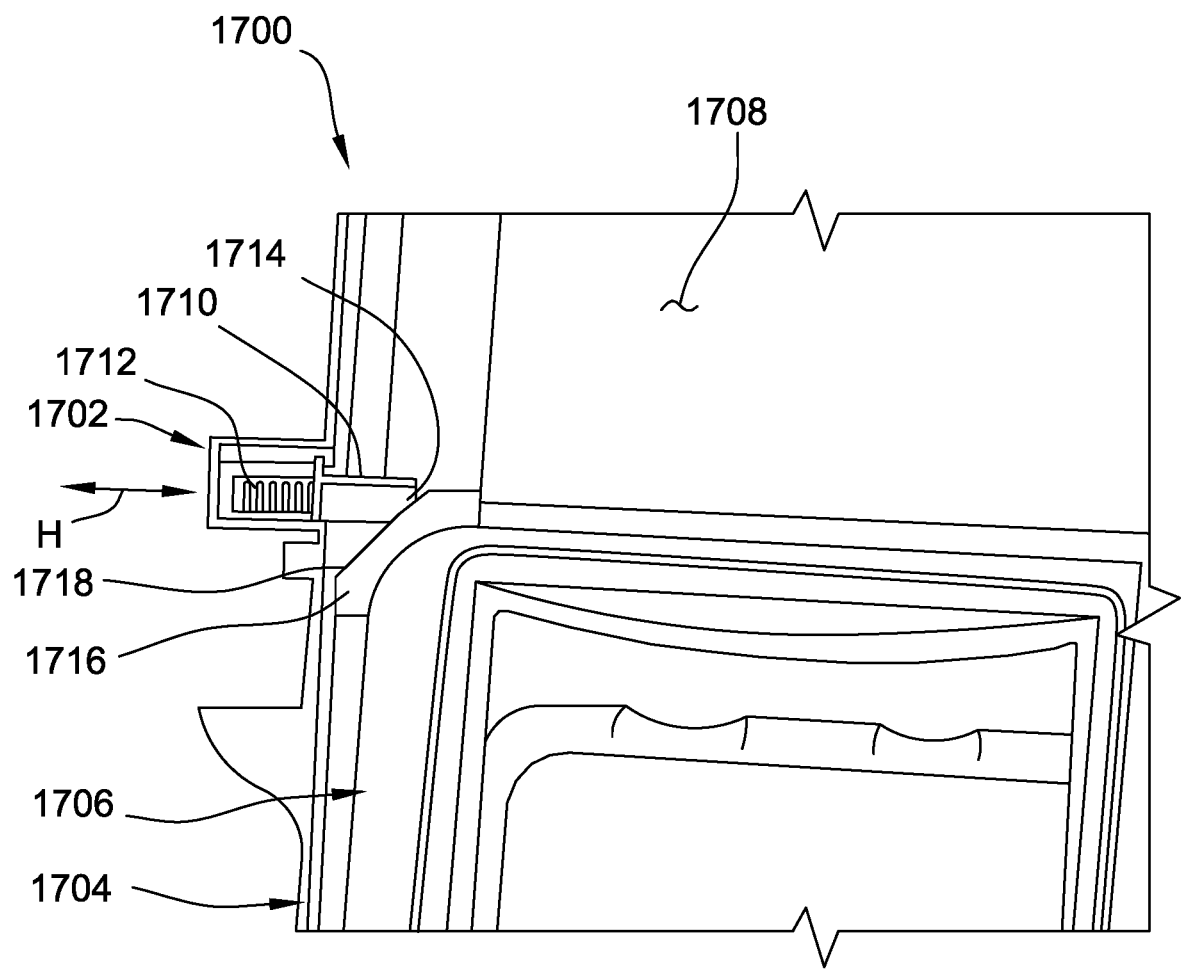
FIG. 17 is a top perspective view of a drum assembly including another embodiment of a stop mechanism suitable for use with the vacuum cleaning system shown in FIG. 1.
Figure 18:
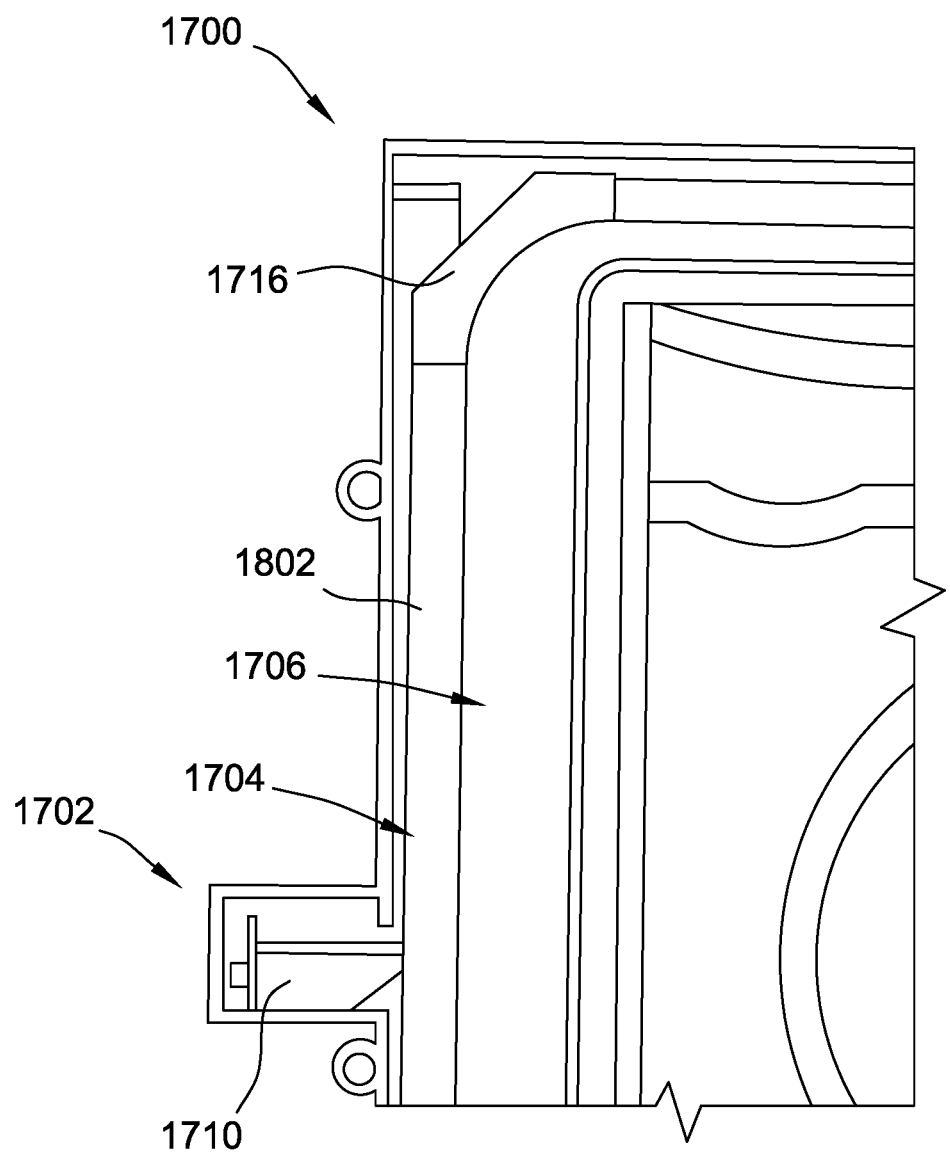
FIG. 18 is a top perspective view of the drum assembly shown in FIG. 17 with a debris container including a filter assembly fully inserted into a housing receptacle.
Figure 19:
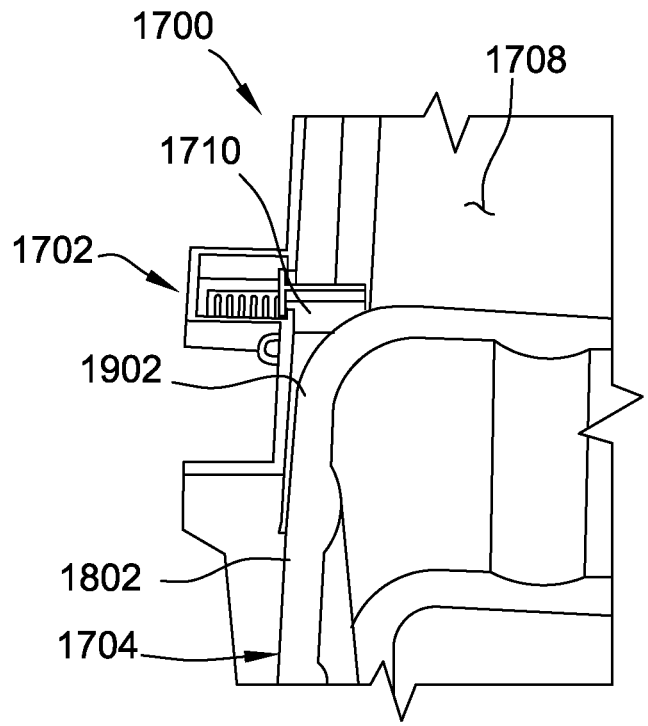
FIGS. 19 and 20 are top perspective views of the drum assembly shown in FIG. 17 illustrating operation of the stop mechanism shown in FIG. 17 as the debris container is inserted into the housing receptacle without a filter assembly.
Figure 20:
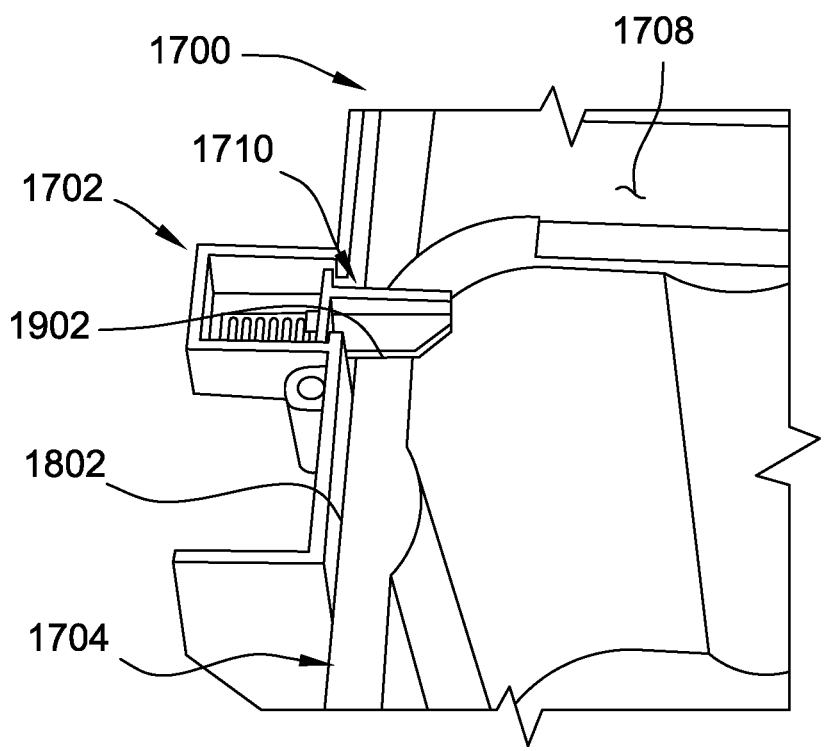

FIGS. 17-20 are top perspective views of a drum assembly 1700 including another embodiment of a stop mechanism 1702 suitable for use with the vacuum cleaning system 100 shown in FIG. 1. FIGS. 17 and 18 illustrate operation of the stop mechanism 1702 as a debris container 1704 of the drum assembly 1700 including a filter assembly 1706 is inserted into a housing receptacle 1708. FIGS. 19 and 20 illustrate operation of the stop mechanism 1702 as the debris container 1704 is inserted into the housing receptacle 1708 without a filter assembly.

In this embodiment, the stop mechanism 1702 includes a slider or retractable pin 1710 that moves in a horizontal direction H between an extended position (shown in FIG. 17) and a retracted position (shown in FIG. 18). A spring 1712 biases the pin 1710 towards the extended position. The pin 1710 includes an angled engagement surface 1714 that engages a portion of the filter assembly 1706 to move the pin from the extended position to the retracted position. Further, in this embodiment, the filter assembly 1706 includes an additional feature or element 1716 (generally, a pin engagement member) that engages the pin 1710 upon insertion of the debris container 1704 into the housing receptacle 1708. The pin engagement member 1716 includes an angled engagement surface 1718 oriented at substantially the same angle as the angled engagement surface 1714 of the pin 1710.

As shown in FIGS. 17 and 18, when the debris container 1704 including the filter assembly 1706 is inserted into the housing receptacle 1708, the pin engagement member 1716 of the filter engages the pin 1710, and moves the pin 1710 to the retracted position. The pin 1710 is maintained in the retracted position as the debris container 1704 is inserted into the housing receptacle 1708 by a sidewall 1802 of the debris container 1704 such that the debris container 1704 can be fully inserted into the housing receptacle 1708.

When the filter assembly 1706 is absent from the debris container 1704, as shown in FIGS. 19 and 20, the pin 1710 engages a stop surface 1902 on the debris container 1704 and inhibits further insertion of the debris container 1704 into the housing receptacle 1708. The stop mechanism 1702 thereby prevents the debris container 1704 from being fully inserted into the housing receptacle 1708.

Figure 21:
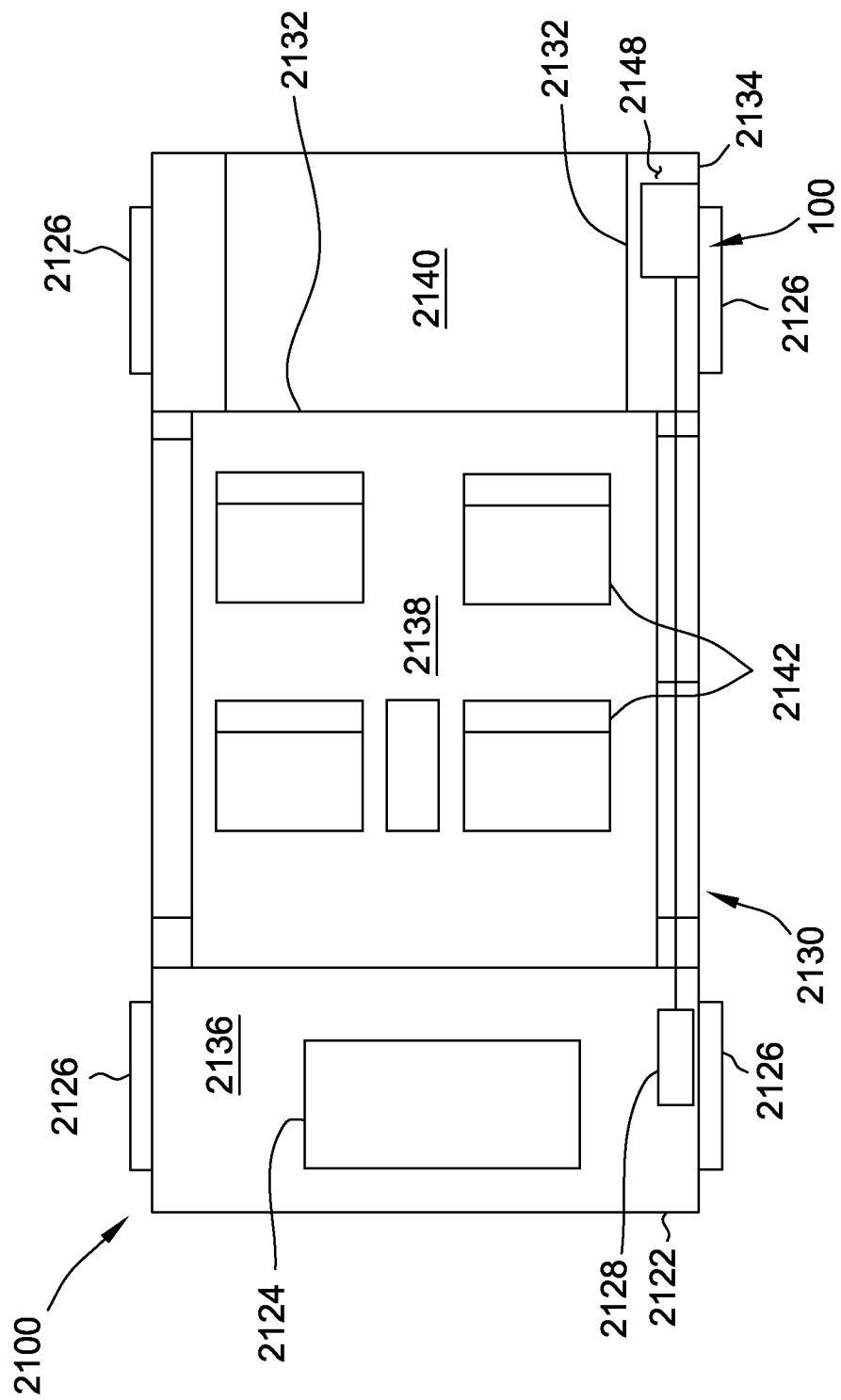
FIG. 21 is a schematic view of an example vehicle embodiment including the vacuum cleaning system of FIG. 1.

FIG. 21 is a schematic view of a vehicle 2100 illustrating an example mounting location of the vacuum cleaning system 100 within a vehicle. The vacuum cleaning system 100 is mounted or installed on the vehicle 2100 to enable vacuum cleaning of the vehicle 2100 with the vacuum cleaning system 100. The vacuum cleaning system 100 may be installed as a stock component on the vehicle 2100 (e.g., at the time of vehicle production), or as an aftermarket component of the vehicle 2100.

In the illustrated embodiment, the vehicle 2100 is an automobile, and generally includes a frame 2122, a propulsion system 2124, a plurality of wheels 2126 rotatably connected to the vehicle frame 2122, and a transmission (not shown) connecting the propulsion system 2124 to one or more of the wheels 2126. The propulsion system 2124 may include any suitable engine or motor that provides power for propelling the vehicle 2100. The propulsion system 2124 may include, for example and without limitation, a gasoline powered engine, an electric motor, and combinations thereof. The transmission is connected to the propulsion system 2124 such that power from the propulsion system 2124 is transmitted through the transmission, to a drivetrain (not shown), and to the wheels 2126 to propel the vehicle 2100. Examples of automobiles in which the vacuum cleaning system 100 may be implemented include, for example and without limitation, cars, trucks, sport utility vehicles, vans, and minivans. In other embodiments, the vehicle 2100 may be a vehicle other than an automotive vehicle including, for example and without limitation, a recreational vehicle, a watercraft vehicle, or an aircraft vehicle.

The vehicle 2100 also includes an energy storage device 2128 that stores electric energy and supplies electrical power to one or more components of the vehicle 2100. In some embodiments, the energy storage device 2128 supplies electrical power in the form of a direct current, and acts as a DC power supply. In other embodiments, the energy storage device 2128 may supply power to components of vehicle 2100 in any suitable manner that enables the vehicle 2100 and the vacuum cleaning system 100 to function as described herein. The energy storage device 2128 may include, for example and without limitation, a rechargeable battery, such as a lead-acid battery or a lithium ion battery. The energy storage device 2128 may be operatively connected to one or more components of the vehicle 2100, such as an alternator, that generates electrical energy during operation of the vehicle 2100. In the example embodiment, the vacuum cleaning system 100 is electrically connected to energy storage device 2128 to receive electrical power therefrom. In other embodiments, vacuum cleaning system 100 may be connected to a power supply other than energy storage device 2128.

In the example embodiment, vehicle 2100 also includes a plurality of panels 2130 connected, directly or indirectly, to the frame 2122 of the vehicle 2100. The panels 2130 of the vehicle 2100 generally include interior panels 2132 and exterior or body panels 2134. The interior panels 2132 are located within an interior of the vehicle 2100, and the exterior panels 2134 are located on an exterior of the vehicle 2100. The vehicle panels 2130 may include, for example and without limitation, door panels, floor panels, subfloor panels, roof panels, dashboard panels, trim panels, and console panels.

The panels 2130 of the vehicle 2100 divide and/or separate the vehicle 2100 into multiple compartments or spaces. In the example embodiment, the vehicle panels 2130 generally separate the vehicle 2100 into an engine compartment 2136, an interior cabin or passenger compartment 2138, and a cargo compartment 2140 (e.g., trunk or truck bed).

The engine compartment 2136 houses components of the propulsion system 2124, such as an engine or motor, and other systems and components of the vehicle 2100, such as an engine lubrication system and an engine cooling system. The passenger compartment 2138 is generally configured to house passengers or occupants of the vehicle 2100, and includes a plurality of seats 2142 for supporting passengers within the passenger compartment 2138. The cargo compartment 2140 is generally configured to house or store cargo transported by the vehicle 2100. The cargo compartment 2140 is a generally open space, free of components of the vehicle 2100. The cargo compartment 2140 may include, for example and without limitation, the trunk of a vehicle, a truck bed, or a storage hatch. In the example embodiment, the cargo compartment 2140 is located in a rear of the vehicle 2100, and is separated from the passenger compartment 2138 by one of the vehicle interior panels 2132. In other embodiments, the cargo compartment 2140 may be separated from the passenger compartment 2138 by a rear row of seats 2142, such as in sport utility vehicles, hatchback vehicles, or minivans.

In this embodiment, the vacuum cleaning system 100 is mounted within an interpanel cavity 2148 (for example, cavity 102, shown in FIG. 1) within the cargo compartment 2140 of the vehicle 2100. In this embodiment, the debris container 116 is accessible through an opening (not shown in FIG. 21) in the interior panel 2132 of the cargo compartment 2140.

In other embodiments, the vacuum cleaning system 100 may be mounted at any other suitable location within the vehicle 2100, such as within the engine compartment 2136, within the passenger compartment 38, within an instrument panel of the vehicle 2100, within a center console of the vehicle 2100, within a seatback of one of seats 2142, within the flooring of the vehicle 2100, and any of the interpanel compartments 2148 defined by the vehicle panels 2130. In yet other embodiments, one or more components of the vacuum cleaning system 100 may be located on the exterior of vehicle 2100, such as within one of the exterior panels 2134 or within an exterior cargo compartment, such as a truck bed.

Example embodiments of vacuum cleaning systems are described above in detail. The vacuum cleaning systems are not limited to the specific embodiments described herein, but rather, components of the vacuum cleaning systems may be used independently and separately from other components described herein. For example, the stop mechanisms described herein may be used with vacuum cleaners other than vehicular vacuum cleaning systems, including without limitation, wet/dry vacuum cleaners, canister vacuum cleaners, upright vacuum cleaners, and backpack vacuum cleaners.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A vacuum cleaning system comprising:
   a housing defining an inlet, an outlet, and a receptacle;
   a motor connected to the housing and adapted to generate air flow through the housing from the inlet to the outlet;
   a debris container slidable into and out of the housing receptacle, the debris container including a stop surface;
   a filter assembly removably connectable to the debris container and adapted to filter the air flow, the filter assembly including an engagement surface; and
   a stop connected to the housing and including:
   a pin moveable between an extended position, in which the pin extends into the housing receptacle, and a retracted position; and
   a spring that biases the pin towards the extended position;
   wherein the pin is adapted to engage the stop surface to inhibit insertion of the debris container when the debris container is inserted into the housing receptacle without the filter assembly, and wherein, upon insertion of the debris container with the filter assembly, the engagement surface at least one of displaces the pin from the extended position to the retracted position and maintains the pin in the retracted position such that the debris container can be fully inserted into the housing receptacle.

2. The vacuum cleaning system of claim 1, wherein the housing includes a pin support at least partially defining a pin cavity sized and shaped to receive at least a portion of the pin therein, the pin support including a shaft guide and a pin stop that limits movement of the pin out of the cavity.

3. The vacuum cleaning system of claim 2, wherein the pin includes a shaft, a head, and an annular rim that engages the pin stop to limit movement of the pin out of the cavity.

4. The vacuum cleaning system of claim 1, wherein the pin includes a head defining an angled engagement surface that engages a front of the debris container when the debris container is removed from the housing receptacle, wherein engagement between the front of the debris container and the angled engagement surface moves the pin from the extended position to the retracted position.

5. The vacuum cleaning system of claim 1, wherein the housing includes a top panel, a bottom panel, and a pair of opposing side panels extending between the top panel and the bottom panel, wherein the top panel, the bottom panel, and the side panels at least partially define the receptacle, and wherein the top panel, the bottom panel, and the side panels define an opening at a front of the housing to allow the debris container to be inserted into and removed from the receptacle.

6. The vacuum cleaning system of claim 5, wherein the housing further includes a mounting flange that adjoins each of the top panel, the bottom panel, and the side panels at the front of the housing.

7. The vacuum cleaning system of claim 1, wherein the stop further includes a visual indicator that provides a visual indication when the filter assembly is absent from the debris container.

8. A vacuum cleaning system mounted in a vehicle, the system comprising:
a housing mounted in the vehicle and defining an inlet, an outlet, and a receptacle;
a motor connected to the housing and adapted to generate air flow through the housing from the inlet to the outlet;
a debris container slidable into and out of the housing receptacle;
a filter assembly connected to the debris container and adapted to filter the air flow; and
a stop connected to the housing and including a retractable pin;
upon insertion of the debris container into the housing receptacle, the filter assembly adapted to at least one of: move the pin from an extended position to a retracted position and maintain the pin in the retracted position such that the debris container can be fully inserted into the housing receptacle.

9. The vacuum cleaning system of claim 8, wherein at least a portion of the pin is positioned within the housing receptacle when the pin is in the extended position, and wherein the pin engages a portion of the debris container when the filter assembly is absent from the debris container to inhibit insertion of the debris container into the housing receptacle.

10. The vacuum cleaning system of claim 8, wherein the debris container includes a stop surface, and wherein the pin is adapted to engage the stop surface to inhibit insertion of the debris container when the debris container is inserted into the housing receptacle without the filter assembly.

11. The vacuum cleaning system of claim 8, further including an exhaust manifold, wherein air flow is exhausted from the vacuum cleaning system through the exhaust manifold and into an enclosed cavity of the vehicle.

12. A vacuum cleaning system comprising:
a housing defining an inlet, an outlet, and a receptacle;
a motor connected to the housing and adapted to generate air flow through the housing from the inlet to the outlet;
a debris container slidable into and out of the housing receptacle;
a filter assembly for filtering air flow; and
a stop connected to the housing and adapted to inhibit mounting the debris container when the filter assembly is absent from the debris container, wherein the stop includes:
a retractable pin moveable between an extended position, in which at least a portion of the pin is positioned within the housing receptacle, and a retracted position, wherein the pin engages a portion of the debris container when the filter assembly is absent from the debris container to inhibit insertion of the debris container into the housing receptacle; and
a spring that biases the pin towards the extended position.

13. The vacuum cleaning system of claim 12, wherein the housing includes a pin support at least partially defining a pin cavity sized and shaped to receive at least a portion of the pin therein, the pin support including a shaft guide and a pin stop that limits movement of the pin out of the cavity.

14. The vacuum cleaning system of claim 13, wherein the pin includes a shaft, a head, and an annular rim that engages the pin stop to limit movement of the pin out of the cavity.

15. The vacuum cleaning system of claim 12, wherein the pin includes a head defining an angled engagement surface that engages a front of the debris container when the debris container is removed from the housing receptacle, wherein engagement between the front of the debris container and the angled engagement surface moves the pin from the extended position to the retracted position.

16. The vacuum cleaning system of claim 12, wherein the debris container includes a stop surface, and wherein the pin is adapted to engage the stop surface to inhibit insertion of the debris container when the debris container is inserted into the housing receptacle without the filter assembly.

17. The vacuum cleaning system of claim 12, wherein the debris container includes a recessed ledge extending from a sidewall of the debris container, the ledge supporting the filter assembly within the debris container, wherein the debris container further includes a stop wall extending from at least one of the ledge and the sidewall, wherein the stop wall engages the stop to inhibit insertion of the debris container into the housing receptacle when the filter assembly is absent from the debris container.

18. The vacuum cleaning system of claim 12, wherein the stop further includes a visual indicator that provides a visual indication when the filter assembly is absent from the debris container.

19. The vacuum cleaning system of claim 12, wherein the filter assembly is positioned in fluid communication between the inlet and the outlet and upstream from the motor.

* * * * *